US008916241B2

(12) United States Patent
Khoury et al.

(10) Patent No.: US 8,916,241 B2
(45) Date of Patent: Dec. 23, 2014

(54) CONTROL SYSTEM FOR CAN COATING

(71) Applicant: Nordson Corporation, Westlake, OH (US)

(72) Inventors: James M. Khoury, Strongsville, OH (US); Charles Nagy, North Ridgeville, OH (US); Stephen G. Nemethy, Lakewood, OH (US); Mark J. Ignatius, Lakewood, OH (US)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 14/052,928

(22) Filed: Oct. 14, 2013

(65) Prior Publication Data

US 2014/0087061 A1 Mar. 27, 2014

Related U.S. Application Data

(62) Division of application No. 12/297,677, filed as application No. PCT/US2007/009725 on Apr. 23, 2007, now Pat. No. 8,578,878.

(60) Provisional application No. 60/746,790, filed on May 9, 2006.

(51) Int. Cl.

| | |
|---|---|
| ***B05D 1/02*** | (2006.01) |
| ***B05D 5/00*** | (2006.01) |
| ***B05D 7/00*** | (2006.01) |
| ***B28B 19/00*** | (2006.01) |
| ***B29B 15/10*** | (2006.01) |
| ***C23C 18/00*** | (2006.01) |
| ***C23C 20/00*** | (2006.01) |
| ***C23C 28/00*** | (2006.01) |
| ***B05B 12/00*** | (2006.01) |
| ***B05B 13/02*** | (2006.01) |
| ***B05B 13/06*** | (2006.01) |

(52) U.S. Cl.
CPC ................ *B05D 1/02* (2013.01); *B05B 12/008* (2013.01); *B05B 13/0228* (2013.01); *B05B 13/0242* (2013.01); *B05B 13/0609* (2013.01)
USPC ......... 427/427.2; 427/8; 427/421.1; 427/425; 118/665; 118/668; 118/681; 118/692; 118/712

(58) Field of Classification Search
None
See application file for complete search history.

(56) References Cited

U.S. PATENT DOCUMENTS 3,452,709 A 7/1969 Hartmeister et al.
3,726,711 A 4/1973 Hogstrom (Continued)

FOREIGN PATENT DOCUMENTS

GB 2405113 11/2005
JP 2004-516925 6/2004

(Continued)

OTHER PUBLICATIONS

International Search Report dated Feb. 13, 2008, for International Application Serial No. PCT/US2007/009725.

(Continued)

*Primary Examiner* — Timothy Meeks
*Assistant Examiner* — Michael P Rodriguez
(74) *Attorney, Agent, or Firm* — Calfee, Halter & Griswold LLP

(57) ABSTRACT

A can coating machine control system includes a coating control signal that functions as a go/no-go signal based on a plurality of monitored conditions such as can in position, vacuum pressure, gun in position, guard in position and speed condition. Local pressure regulation of the coating material in the spray gun is provided along with optional control of the material temperature. Local pressure regulation allows for optional spray weight control based on a wrap number derived from speed and gun spray durations. A CAN to CAN network buffer is provided as well for primary network isolation. A gun control circuit may be used to select specific gun drive signals and to adjust gun drive signals based on real-time feedback of the actual spray duration.

6 Claims, 12 Drawing Sheets

(56) References Cited

U.S. PATENT DOCUMENTS

| | | | |
|---|---|---|---|
| 3,797,456 | A | 3/1974 | Hogstrom |
| 3,921,570 | A | 11/1975 | Hogstrom et al. |
| 4,378,386 | A | 3/1983 | Rehman |
| 4,382,422 | A | 5/1983 | Eddy et al. |
| 4,430,886 | A | 2/1984 | Rood |
| 4,668,948 | A | 5/1987 | Merkel |
| 5,254,164 | A | 10/1993 | Masahumi |
| 5,481,260 | A | 1/1996 | Buckler et al. |
| 5,755,884 | A | 5/1998 | Buckler et al. |
| 5,791,531 | A | 8/1998 | Hassler, Jr. |
| 5,808,559 | A | 9/1998 | Buckler |
| 5,999,106 | A | 12/1999 | Buckler |
| 6,579,563 | B1 * | 6/2003 | Dillon ............................... 427/8 |
| 6,611,203 | B2 | 8/2003 | Whitmore et al. |
| 2005/0160980 | A1 | 7/2005 | Khoury et al. |

FOREIGN PATENT DOCUMENTS

| | | |
|---|---|---|
| WO | 02/34417 | 5/2002 |
| WO | 2005/016552 | 12/2005 |

OTHER PUBLICATIONS

Office Action dated Aug. 7, 2012, for Japanese Patent Application Serial No. 2009-509594.

Office Action dated May 16, 2013, for Canadian Patent Application Serial No. 2,652,313.

* cited by examiner

CONTROL SYSTEM FOR CAN COATING

RELATED APPLICATION

The present application is a divisional application of U.S. patent application Ser. No. 12/297,677, filed Oct. 20, 2008, for CONTROL SYSTEM FOR CAN COATING, which is a national phase entry under 35 U.S.C. §371 and claims priority to International Application No. PCT/US07/09725, with an International Filing Date of Apr. 23, 2007, for CONTROL SYSTEM FOR CAN COATING, which claims the benefit of U.S. Provisional patent application Ser. No. 60/746,790 filed on May 9, 2006 for IMPROVED CONTROL SYSTEM FOR CAN COATING, the entire disclosures of which are fully incorporated herein by reference.

TECHNICAL FIELD OF THE DISCLOSURE

The disclosure relates generally to apparatus and methods for spraying or otherwise applying coating material onto a surface, such as, for example, the interior surfaces of a rotating can. More particularly, the disclosure relates to monitoring and control functions useful for coating operations.

BACKGROUND OF THE DISCLOSURE

Spraying a coating material onto the surface of a body is commonly done. For example, interior surfaces of metal beverage cans are coated to preserve the flavor of the contents from being changed due to contact with a metal surface. A variety of spray systems have been developed over the years. In the can industry, can interiors are sprayed using one or more spray applicator devices or spray guns having one or more nozzles positioned near the can interior. Material is sprayed onto the can surfaces typically while the can is rotated. Can surfaces may include interior and exterior surfaces.

In many applications it is important to assure that the entire surface is coated. The amount of material that is applied to a surface is usually measured in terms of coating weight. In an ongoing effort to reduce costs, coating weights have also been reduced. However, lower coating weights necessitate tighter control over the coating process. There are many process variables that affect coating weight, including temperature, pressure, viscosity, spray duration, nozzle flow rate and pattern control, and spray applicator position. In typical known rotating coating application systems, each deposition of material onto the circumferential surface of the container body is called a wrap. In a known can coating system, a can may be coated with a single wrap or two or more wraps including fractional or partial wraps.

The amount of material that is applied to a rotating surface is a function of the above noted process variables, the number of wraps, and also the rotation speed of the surface. If the rotation speed were always a known constant, then the amount of material applied to the surface could be better controlled within the ability of the manufacturer to control the other process variables. As such, the other process variables noted above have a significant impact on the coating weight and completeness of each wrap. For example, the actual spray duration can have a major impact on the amount of coating material applied to the rotating surface as a function of the speed of rotation. Spray duration refers to the time duration that coating material impinges the surface being sprayed. Spray duration is thus affected by flow characteristics of material through the spray application device, material transport times and spray device turn on and turn off time delays.

The turn on time delay refers to the time delay between the command to turn the spray application device on via a first trigger signal to the spray application device and the actual time that material begins to impinge the surface. Turn off delay refers to the time delay between the command to turn the spray application device off via a second trigger signal to the spray application device and the actual time that material stops impinging on the surface. If the rotation speed is not constant, the spray duration time greatly impacts the completeness of the wraps and the distribution of coating weight applied during each wrap.

In can coating operations, it is common to support a can on a spray machine when coating the interior of the can. The spray machine supports a number of cans and sequentially indexes them past one or two spray guns that coat the cans. The can is normally supported on a mandrel by the force of a vacuum. Thus the mandrel is referred to as a vacuum chuck. The vacuum chuck rotates the can at a desired speed during the time that the can is stopped in front of the spray gun. Normally, the can is completely coated after being rotated two or three revolutions while being sprayed with coating material. Each complete revolution is called a "wrap".

An existing system for monitoring and controlling the coating of the can on a spray machine is the Nordson iTrax® System. This system is available for purchase from Nordson Corporation, Amherst, Ohio and is described, at least in part, in International Publication Number WO 2005/016552 A2, published Feb. 24, 2005 that is hereby incorporated by reference in its entirety.

Even though a can is set to rotate at a desired speed on a spray machine as described above, the can may not be spinning properly. If the can is not rotated properly during the spraying operation, it may not be properly coated. It is also possible that even though the can is properly rotated, it is not properly sprayed. Improperly coated cans must be detected before they are filled with a food or beverage and sold to a consumer.

SUMMARY OF THE INVENTION

The present disclosure includes in a first inventive aspect a control function for a can coating machine, in which the control function operates to inhibit or enable a coating operation under predetermined circumstances or conditions. In one embodiment, the control function may be realized in the form of a control signal that in one state indicates a 'good-to-go' or 'ready-to-spray' condition, and in another state indicates a fault condition, based on a predetermined set of monitored conditions. In a more specific exemplary embodiment, the control signal state may be used before a coating operation begins. In another exemplary embodiment, the predetermined set of conditions are selected from the following: can in position, gun in position, safety device in position, acceptable speed of rotation, acceptable vacuum holding a can in position. The control signal may be used, for example, to prevent a coating operation when one or more fault conditions are present.

In accordance with another inventive aspect of the disclosure, pressure regulation of the coating material may be performed by monitoring and regulating pressure of the coating material proximate to or in a spray gun, and optionally monitoring and controlling temperature of the material proximate to or in the spray gun. In one embodiment, a pressure sensor and optionally a temperature sensor are disposed in a sensor head or other available supply connection attached to a spray gun. In another exemplary embodiment, a pressure regulation system is provided locally near the spray gun.

In accordance with another inventive aspect of the disclosure, use of pressure regulation by monitoring coating material pressure proximate to or in the spray gun, and optionally temperature of coating material proximate or in the spray gun, allows a control system to control coating weight by adjusting base pressure of the coating material at the spray gun as a function of a determined wrap number. In one embodiment, if a wrap number is low then the base pressure may be increased, and if a wrap number is high the base pressure may be decreased. In a specific exemplary embodiment, a wrap number may be determined from speed of rotation and spray duration.

In accordance with another inventive aspect of the disclosure, a remote display feature may be provided near or proximate a spray machine so that an operator may observe system performance at the machine rather than from a more distant location beyond the operator's line of sight.

In accordance with another inventive aspect of the disclosure, a second control system may be added on to an existing control system for effecting one or more of the above features or additional others, including but not limited to the inhibit/enable control function, pressure regulation at the spray gun, pressure adjustment based on wrap number, and the remote monitor. In one embodiment, the second control system may be a module that interfaces with the primary control system over a network, but with a intermediate buffer to isolate the networks. This aspect of the disclosure may be useful, for example, in system upgrade and retrofit situations of a prior existing system.

In accordance with another inventive aspect of the disclosure, a sensor may be provided to produce a signal that is related to or corresponds to rotation speed of the work piece or a work piece holder. This speed signal may relate to actual speed or a speed threshold indicator, for example. The speed signal in a more specific embodiment may be used as one of the monitored conditions for the "good-to-go" control signal. A circuit may be used that provides a speed error signal when the detected speed is outside a predetermined range.

In accordance with another aspect of the invention, a third control system may be provided that operates as a gun control circuit. In a specific embodiment, a gun control circuit adjusts the spray gun drive signal in order to control the actual spray duration. In a more specific embodiment, a pressure sensor at or near the spray gun may be used to detect transitions between base and fire pressures to indicate actual spray duration. In another embodiment, a gun control circuit may be used to select and produce an appropriate gun drive signal based on the type of spray gun in use. In still a further alternative embodiment, multiple gun control circuits may be daisy chained together to simplify and expedite field wiring. In still another embodiment, the gun control circuits may communicate with other control circuits or modules (or both) over a network. In still a further alternative embodiment, a gun control circuit may issue a warning or inhibit signal if an operator attempts to program a spray gun outside of its capabilities. For example, attempting to make a spray gun fire faster than it is designed to do and still achieve proper coating.

In accordance with another inventive aspect of the disclosure, a modular control system for a work piece coating system is contemplated. The modular concept utilizes two or more functional modules that may communicate with each other over a network, as well as with an operator interface device such as a computer. Each module includes control and/or monitoring functionality and associated circuits. The modular design allows for selective configuration of a coating system by including modules as needed for specific functions.

The networked modular design also allows for simple extension of the system for additional spray guns and spray machines. In an exemplary embodiment, modules may be provided for gun control, pressure control, temperature control, remote displays and multifunction "good-to-go" control signal generation.

The present disclosure also contemplates, as another inventive aspect, the various control systems, functions and operations, either alone or in various combinations and subcombinations thereof, used with a coating application system.

Also disclosed herein are various inventive methods including but not limited to method for pressure regulation of the coating material pressure in a spray gun or other application device, a method for spray duration control, and method for adjusting pressure as a function of a wrap number determination.

These and other aspects and advantages of the present invention will be readily appreciated and understood from the following detailed description of the invention in view of the accompanying drawings.

DETAILED DESCRIPTION OF THE EXEMPLARY EMBODIMENTS

1. Introduction

Figure 1:
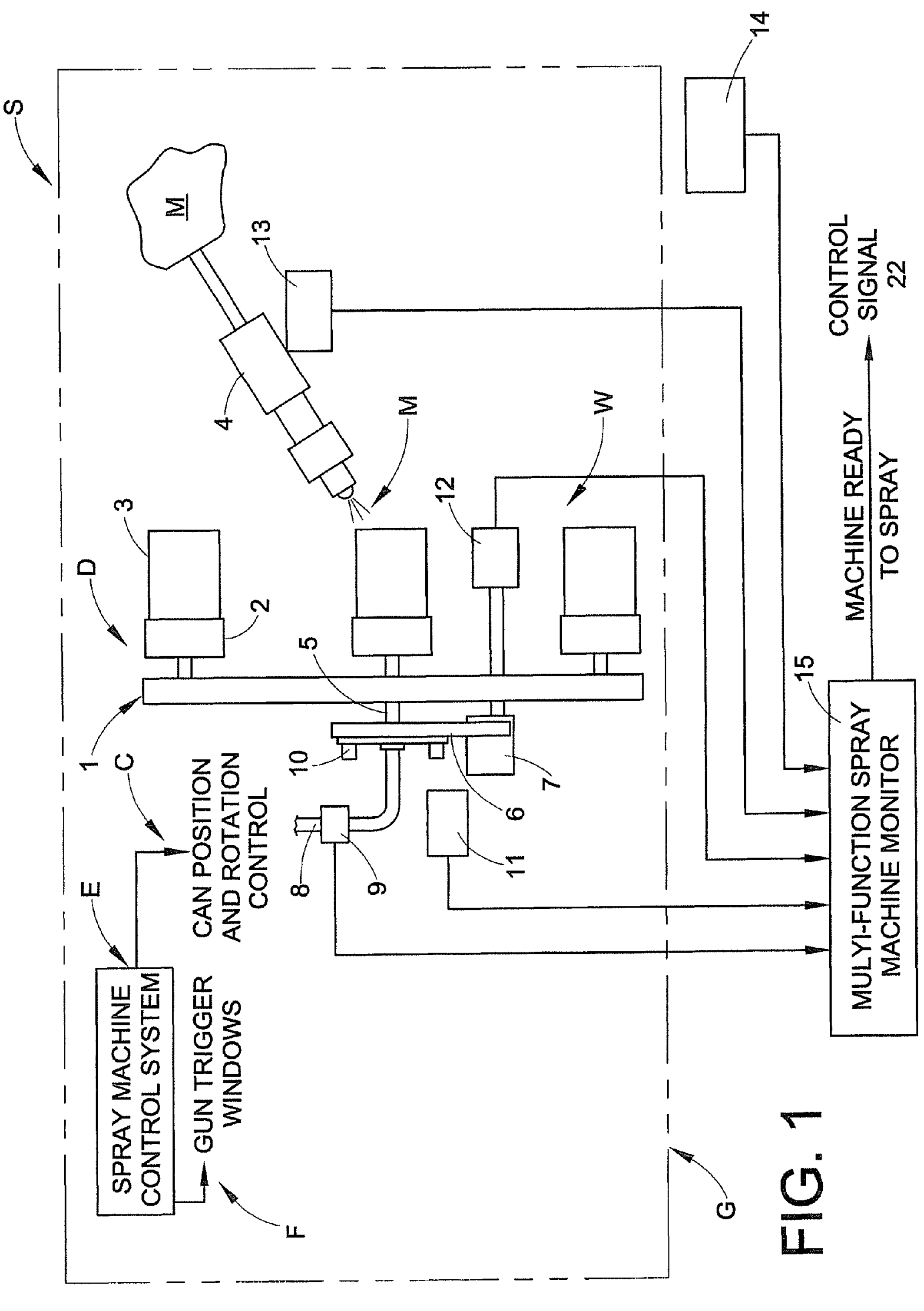
FIG. 1 is a simplified schematic diagram of a typical and exemplary can coating machine shown with one embodiment of a multifunction monitor in accordance with one of the inventions in this disclosure.

The present disclosure is directed to apparatus and methods for application of material onto a work piece surface, such as, for example, the rotating surfaces of a can. In an exemplary embodiment, the inventions are illustrated herein for use with a spray coating process and apparatus for spraying a coating material, such as for example water and/or solvent borne coating material, to the interior surface of a rotating can body. For example, coating material may be applied to the interior surface of a two piece or three piece can body or outside dome spray.

While the inventions are described and illustrated herein with particular reference to various specific forms and functions of the apparatus and methods thereof, it is to be understood that such illustrations and explanations are intended to be exemplary in nature and should not be construed in a limiting sense. For example, the inventions may be utilized in any material application system involving the application of material to a rotating surface, and some inventions may find useful application to other coating application systems in which the coated surface is not rotating. The surface need not be a can surface, and need not be an interior surface, but may include exterior surfaces, generally planar, curvilinear and other surface geometries, end surfaces, and so on. The application system illustrated herein is a spray coating application system, however the word "spray" is not intended to be limiting. The inventions may be similarly applied to other coating or material application techniques such as, for example, deposition, coating, brushing and other contact and non-contact application systems, as well as for liquid and non-liquid coating materials. The surface being coated may be rotated by a number of different techniques and apparatus and the various inventions are not necessarily limited to any particular rotation technology. Although the exemplary embodiments illustrate a modular type distributed control system, it will be readily appreciated that many of the inventive aspects described herein may be implemented in a system that is neither modular nor networked.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

2. Detailed Description

With reference to FIG. 1, a material application system, generally designated with the letter S, may be used for applying a coating material to surfaces of one or more workpieces W. In the illustrated embodiments the workpieces are cans. The workpieces are controlled with a can rotation drive mechanism D which may be any one of a wide variety of well known systems, both known and those later developed. Such systems typically use a star wheel 1 to hold, position and spin a plurality of cans to be coated, such as by spraying for example. A can that is to be sprayed enters a pocket-like zone where it can be spun about the can's longitudinal axis by a drive belt or wheel or other suitable device. The system may include a protective guard or shield G generally indicated with the dashed box in FIG. 1 that substantially encloses the system S to protect an operator. Typical drive mechanisms spin the cans at about 500 rpm to about 3000 rpm, but the present disclosure is not limited to any particular range of rotational speeds. Suitable examples of drive mechanisms that may be used with the present inventions are described in U.S. Pat. Nos. 3,452,709; 3,726,711; 3,797,456; 4,378,386; and 5,254,164 the entire disclosures all of which are fully incorporated herein by reference. With the present inventions, it is not a requirement that the drive mechanism spin the cans at a tightly controlled speed of rotation, but rather at least controlled within an acceptable range.

The coating machine such as spray machine S further includes at least one material application mechanism or coating device 4 that sprays or otherwise deposits or applies a coating material M (FIG. 2) to a surface of the rotating workpiece, such as the inside surfaces of a beverage can for example. The particular application mechanism or coating device 4 selected will depend on many factors including but not limited to the characteristics of the material being applied such as viscosity, flow rates, required spray patterns if any, temperature, pressure and so on. Any number of many different types of material application devices may be used with the present invention. Examples include but are not limited to a spray applicator or spray gun Models A20A or MEG, available from Nordson Corporation, Westlake, Ohio. However, those skilled in the art will readily appreciate that many different forms and types of application devices, both known and later developed, may be used with the inventions. For the remainder of this disclosure we will often refer to the application mechanism as a spray gun or coating device without intending to limit the invention to use of such a spraying device or a particular spraying or material application or coating technology.

Figure 2:
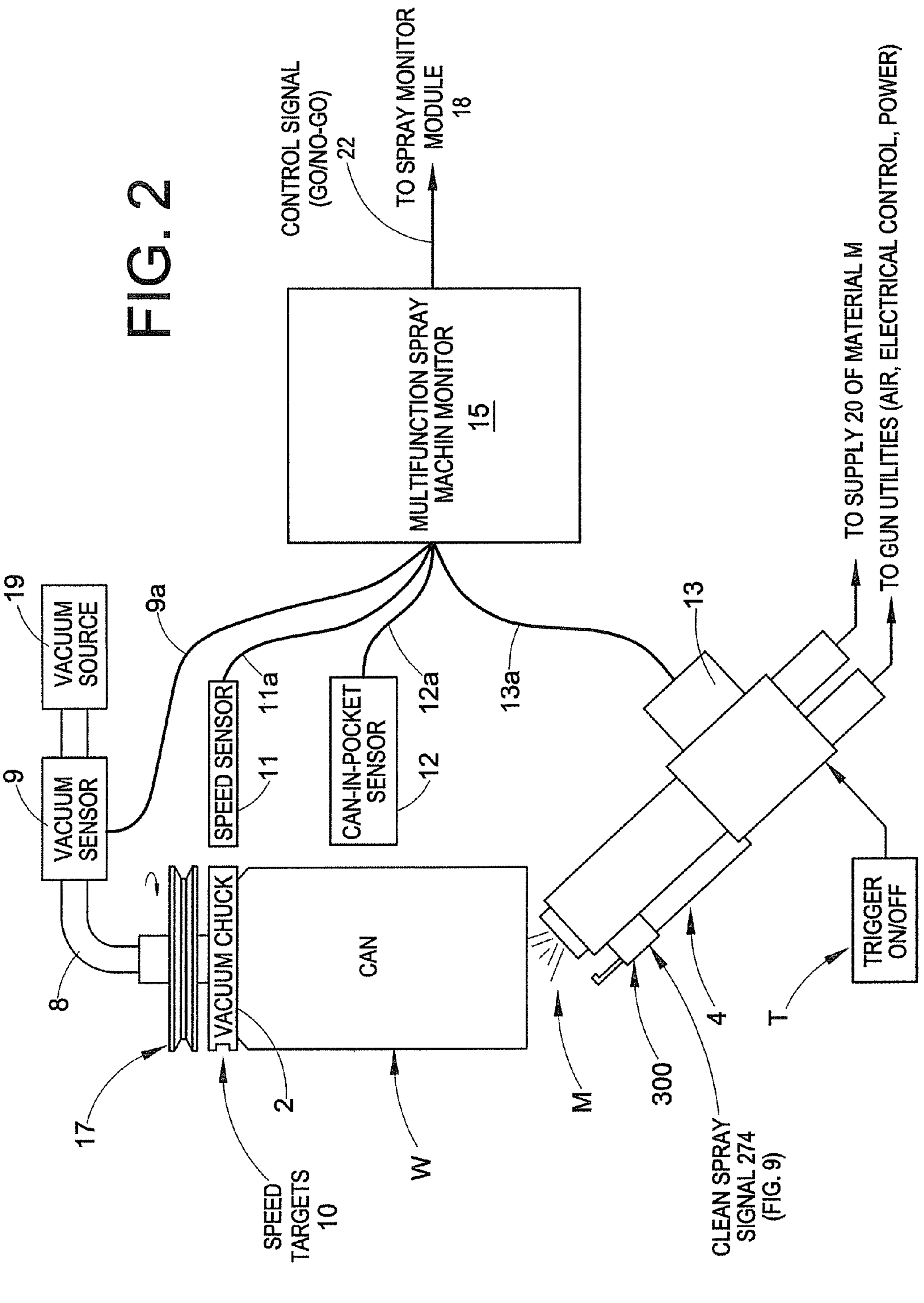
FIG. 2 is a more detailed schematic diagram of a portion of the can coating machine of FIG. 1 illustrating a can in position for a coating operation.

The application mechanism or spray gun 4 may be supported on any suitable structure, including a robotic arm, for example, so that the spray gun position may be manually or automatically controlled as the case may be. The spray gun 4 operates in response to a number of control signals and functions, including an on/off control or trigger function T (FIG. 2). This trigger control function is typically realized in the form of one or more electrical or pneumatic drive signals that instruct the spray gun 4 to turn on and off. The trigger control T will take an appropriate voltage/current waveform in relation to the type of spray gun 4 being controlled. A typical coating system may include multiple spray lines and each spray line may use one or more spray guns at one or more spray stations. More than one type of spray gun may be used in the various spray lines or even within a single spray line. Different gun types typically have different drive signals. Thus, the trigger signal T is a generic reference to the timing signals and associated drive signals or waveforms that cause the spray gun to turn on and off at selected times. The trigger signal T may be generated by an appropriate control circuit, such as, for example, a gun control circuit as described herein below, or other suitable control circuit.

Each spray line may include one or more spray machines S. Each spray machine S typically includes a spray machine control system E. The spray machine control system E typically is realized in the form of a PLC or other suitable programmable control circuit. The control system E controls a spray time window F (also see signal 270, FIGS. 9 and 10) when the control system E has positioned a can for a coating operation and is rotating the can via the drive D. The spray machine control system E may be realized, for example, as an electronic circuit in the form of any programmable digital or analog control circuit. Other control systems however, including mechanical controls, may be used in appropriate applications. The control functions C of the spray machine control system may include control of the spray applicator 4, the drive mechanism D (FIG. 1) and a supply 20 (FIG. 2) of material to the spray applicator 14. The supply 20 may be realized in the form of any of a wide variety of pump supply systems, for example, well known to those skilled in the art or later developed.

In the exemplary embodiments, each spray machine S includes two spray guns 4 and two drive systems D. Note that FIGS. 1 and 2 only illustrate a single gun and drive mechanism for clarity.

FIG. 1 illustrates an exemplary spray machine S comprised of the star wheel 1 supporting a number of workpieces W such as cans 3 generally facing opposite a spray gun 4. A spray machine S may include only one coating station such as shown in FIG. 1 or may include two or more coating stations each having a star wheel and spray gun. Each can 3 has an open end, and a closed end that is supported on a rotating vacuum chuck 10 (FIG. 2). In FIG. 1, one can at a time is in the spray position opposite to the gun (also referred to herein as in the spray 'pocket'). The star wheel 1 sequentially indexes the cans into the spray position opposite the gun. We use the terms 'can in pocket' and 'can in position' interchangeably herein (and sometimes abbreviated CIP), with the intended meaning in both cases to be a reference to the workpiece being in a correct position opposite a spray gun or other coating material applicator for a coating operation.

With reference to FIGS. 1 and 2, the star wheel 1 may have a number of vacuum chucks 2 supporting the cans 3, with one can 3 at a time positioned opposite the spray gun 4. The star wheel 1 with each of the vacuum chucks 2 is rotated or indexed by a shaft 5 connected to a motor 7 so as to position the next can to be coated opposite the spray gun 4. In addition, each vacuum chuck 2 includes a driven member 17 (like a pulley wheel for example) that is rotated by a belt and motor or other suitable drive mechanism (not shown). A vacuum line 8 is connected from a vacuum source 19 (FIG. 2) to each vacuum chuck 2 so that the force resulting from the vacuum suction is used to secure or hold the can to its respective chuck 2. According to one of the inventive teachings of the present disclosure, a vacuum sensor 9 is provided to monitor the vacuum level at the vacuum chuck 2 to ensure that there is enough vacuum induced pressure to properly secure the can to the rotating chuck.

In addition, the rotating chuck 2 may be provided with metal or other suitable speed targets 10 that rotate past an optional speed sensor 11 that monitors or detects the speed of the rotating chuck to ensure that the chuck 2 and the can 3 are rotating at a proper coating speed. Many alternative arrangements and techniques may be used for the speed sensor, including optical sensors, magnetic sensors and so on. The speed sensor 11 output thus may be a signal that varies with the speed of the chuck, or may include circuitry that outputs a signal indicating whether the detected speed is within an acceptable range, or any other suitable speed indicating signal as the case may be for a particular control system design. The speed detection may be performed while a can is present in the spray pocket, or when outside the spray pocket.

A can-in-position or can-in-pocket (CIP) sensor 12 monitors the presence of a can in the spray position and an optional gun-in-position sensor 13 ensures that a spray gun is in the proper position for spraying the can during a coating operation. For example, for a manually operated gun positioning arrangement, after the spray gun is properly positioned on a suitable support structure, a proximity sensor 13 or other suitable detector may be positioned so as to detect the properly positioned gun. Thereafter, if the gun position changes, the sensor 13 output will change to indicate the gun is no longer in its correct position for a coating operation. As another alternative, if an automatic gun positioning arrangement is used—such as a robotic arm for example—the associated motor or motor control may output a signal when the gun is properly positioned, or a proximity sensor may still be used. An optional safety guard sensor 14 ensures that the safety cage G has been positioned and/or locked around the spray machine before it begins to rotate to protect any operator in the area.

In all cases of the monitored conditions, many different techniques and arrangements—far too many to list—may be used to generate signals for the can-in-pocket, gun-in-position, vacuum acceptable, speed related signal and guard-in-position conditions.

Although the exemplary embodiments herein illustrate a vacuum chuck, there are many other known ways to secure the cans to the drive mechanism D or star wheel 1, including clamps, electromagnetic devices and so on. The inventive concepts herein are not necessarily limited to the use of a vacuum chuck, but rather a more general concept of monitoring or detecting that a can to be sprayed is being adequately held in place, however that determination may be made. Furthermore, the concept below of a coating operation control signal may be implemented based on monitored conditions that do not include a vacuum chuck or the holding force of the can on the star wheel.

Although the gun in position sensor, the speed sensor and the guard in position sensor are noted as being optional, in some applications the CIP sensor and the vacuum sensor may also be optional. In other words, one of the inventive aspects of the disclosure is to provide a control signal for a coating operation that is used to indicate that the system is ready to spray ("RTS"), or in other words a 'good-to-go' ("GTG") coating operation control signal 22. The good-to-go or ready-to-spray coating operation control signal thus functions as a go/no-go indicator to an operator and/or a control circuit that various selected conditions are okay to allow a coating operation to begin. The selected conditions may be chosen based on overall requirements for a particular application, and in general will typically relate to those conditions that if not acceptable should inhibit a coating operation or at least result in a warning indication of some suitable format. In the exemplary embodiment, the CIP condition and the adequate vacuum condition are the chosen minimum conditions that must be acceptable since these conditions can significantly affect the quality of the applied coating material. However, in many situations the speed condition, guard position and gun position may also be deemed important enough to form part or all of the criteria for the go/no-go control signal. In other applications, the CIP and/or vacuum conditions may be deemed optional. Thus, the developed control signal 22 may be based on these exemplary conditions, a subset thereof, or additional and different monitored conditions as a matter of design choice.

The characterization of the control signal 22 as being a go/no-go type signal is merely one exemplary embodiment in which the control signal 22 may be used to enable or inhibit a coating operation. In other embodiments, the control signal 22 may simply issue a warning signal of some suitable format (such as a warning light, buzzer, screen icon and so on) that indicates to the operator that there is a fault condition in one or more of the selected conditions being monitored to generate the control signal 22. The control signal 22 therefore is more generally to be understood as developed from a multifunction set of input conditions and an output state that indicates whether there is a fault or other abnormality condition in one of more of the input conditions. The control signal 22 may be used to automatically inhibit a coating operation on a can by can basis, to inhibit a coating operation if the fault condition persists past a pre-selected number of coating operations, or may provide an indication or warning to the operator, allowing for the operator to decide whether to inhibit or continue with a coating operation.

The speed sensor 11 produces an output signal 11*a* that may be a signal that simply indicates whether a minimum acceptable speed is detected, or may be an actual speed based signal that is then interpreted by other circuits in the system to determine if the speed is within an acceptable range for a coating operation. The vacuum sensor 9 produces an output signal 9*a* that may be a signal that simply indicates whether a minimum acceptable vacuum is detected, or may be the actual vacuum based signal that is then interpreted by other circuits in the system to determine if the vacuum is within an acceptable range for a coating operation. The CIP sensor 12 generates a signal 12*a* that indicates whether a can is in position for a coating operation. The gun in position sensor 13 produces a signal 13*a* that indicates whether the spray gun 4 is in position for a coating operation, and the guard position sensor 14 produces a signal 14*a* that indicates whether the safety device 14 such as a protective cage is in position for a coating operation The signals from these five sensors 9, 11, 12, 13 and 14 (or more or less as the case may be based on system design) are input into a multifunction spray machine monitor circuit 15. The multifunction machine monitor circuit 15 may execute a wide variety of monitor and control functions for the system S, or in a simplified embodiment may receive the monitored condition signals, such as from the five sensors described herein for example, and produce the control signal 22 output to a control circuit such as, for example, a spray monitor circuit module 18. In accordance with an inventive aspect of the present disclosure, the multifunction machine monitor circuit 15 may execute, monitor and control one or more functions associated with the system S locally, rather than having those functions controlled from a remote or distant location such as over a network.

For example, in one embodiment the monitor circuit 15 may be used to locally regulate the base pressure of the coating material for the spray gun 4 as a function of a commanded base pressure that is part of a coating operation recipe. Alternatively, the monitor circuit 15 may be used to regulate back pressure at the source 20 pump regulator, for example. In another embodiment, the monitor circuit 15 may locally regulate temperature of the coating material for the spray gun 4 based on a commanded temperature that may be part of a coating operation recipe. Still further, the monitor circuit 15 may monitor the conditions from the condition sensors and generate the go/no-go control signal 22. Alternatively though, the control signal 22 may be generated in any circuit within the over system S. Other local control functions may be executed as needed for particular systems S. For example, as described further herein below, a remote display (FIG. 7) may be provided to allow an operator to observe coating operation conditions and parameters while the operator is physically near the machine, rather than having to be possibly in a more remote location. Because the monitor circuit 15 is preferably used for local control and monitor functions, it is contemplated that in a preferred but not required embodiment the monitor circuit 15 will be physically located in fairly close yet practical proximity to the spray machine S, such as in an electrical box mounted on or near the spray machine. This arrangement, for example, can be particularly useful for pressure regulation and the remote monitor functions, and minimizes or reduces interface wiring. Typically, there will be a multifunction monitor circuit 15 at each spray machine. Each circuit 15 may operate for a single gun spray machine, or in the case of the exemplary embodiment of FIG. 8 operate for two spray guns per spray machine, although such circuits may alternatively operate for more than two spray guns.

Although it is noted that a single circuit arrangement may be used to implement the various local control and monitoring functions herein, this is not intended to imply that a single circuit must be used. Separate circuits and controllers may be used as required for the various functions of the monitor circuit 15 or various functions may be combined into a single controller. For example, the control signal 22 in one embodiment may be realized in the form of a simple AND logic function that can be realized in any circuit located anywhere convenient, or as part of a more complex control circuit 15 or 18. The control signal 22 may alternatively be developed as a software signal for example. Thus, for the various control and monitor functions herein, the actual implementation and form of the circuits, signals and controls may be software, hardware, a combination thereof, or otherwise largely a matter of design choice based on the overall design criteria of the system. Therefore the words 'circuit', 'system', 'signal' and 'control' should be very broadly interpreted to include any form of realization of these features including software, hardware or a combination thereof as the case may be. In one embodiment, the spray monitor circuit 18 may be, for example, an iTrax™ system noted herein above, with the monitor circuit 15 being an add-on feature or module to such a system.

If the appropriate inputs are received from all five sensors indicating that the system is ready to spray (in other words, none of the input signals being monitored indicates a fault condition), then the monitor circuit 15 outputs the control signal 22 in a first state indicating that the machine is ready to spray (a GTG or RTS signal). This state of the control signal may thus be used as an enable signal to permit a coating operation to proceed. If one or more sensors do not provide an appropriate signal to the monitor circuit 15 (in other words, at least one or more of the signals being monitored indicates a fault condition), then the control signal 22 will be output from the monitor circuit 15 in a second state indicating the machine is not ready to spray. This state of the control signal may thus be used as an inhibit or disable signal to prevent a coating operation from proceeding. Alternatively, the second state may be used as a warning or to generate an appropriate warning to the operator that a fault condition has been detected, whether or not the control signal second state is used as an automatic coating operation inhibit function.

Accordingly, one of the inventive teachings of the present disclosure, is that a customer can select that a can will not be sprayed with coating unless the can is securely held to the chuck, is rotating at the proper speed and is in the right position for a coating operation, and unless the spray gun is in the right position as well with the safety cage secured around the machine. These sensors, or any subset thereof, or other sensors as needed, help to ensure that certain of the problems that can cause cans to be improperly sprayed are detected before the cans are sprayed with coating material. Thus, these sensors, alone or in combination with the multifunction spray machine monitor 15 improve the control capabilities of the spray monitor system 18 such as an iTrax™ system.

Figure 3:
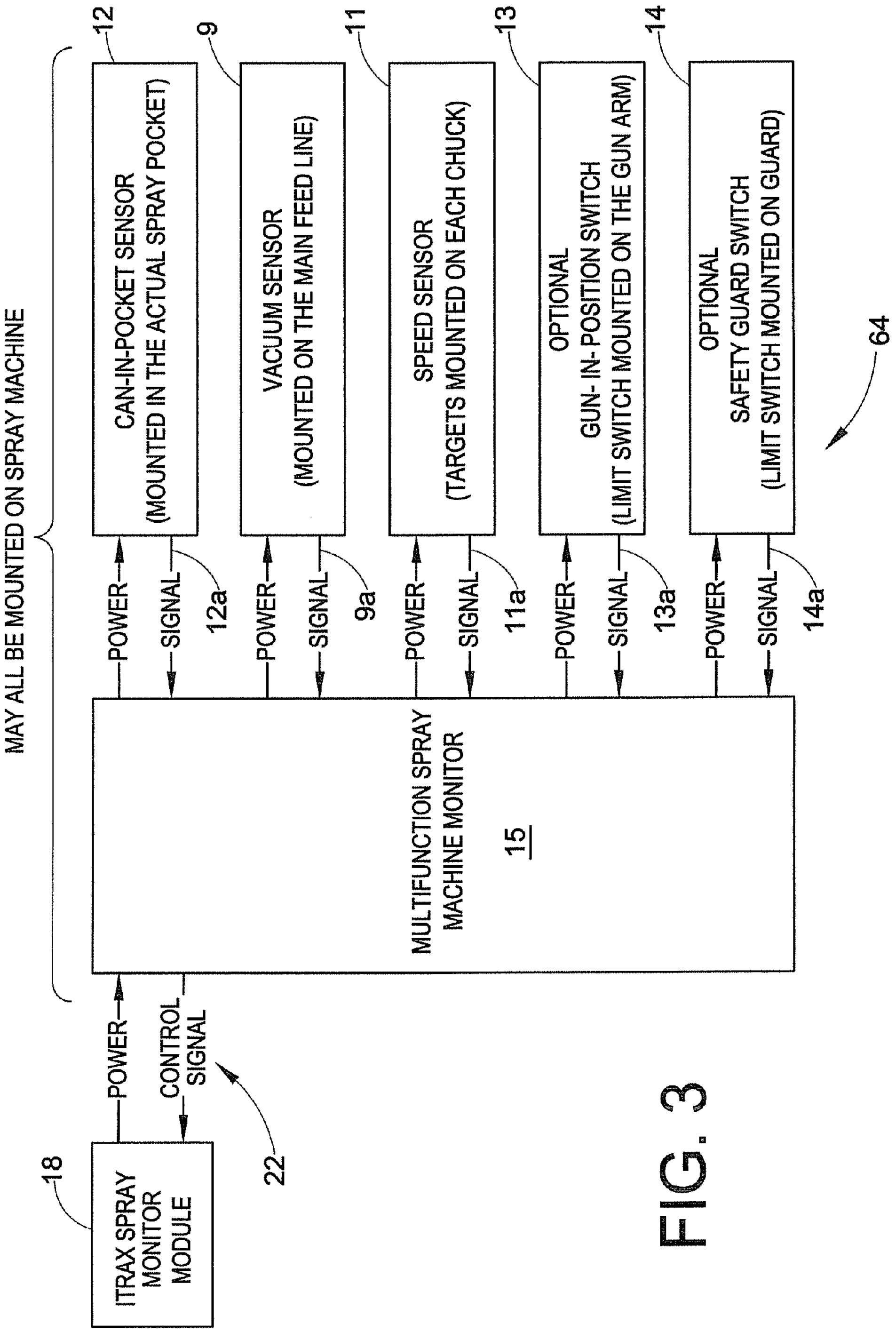
FIG. 3 is a functional block diagram of a circuit that generates an exemplary control signal based on two or more exemplary monitored conditions.

With reference to FIG. 3, the multifunction spray machine monitor circuit 15 may be used to provide electrical power to the various sensors, and to receive the output signals therefrom. The monitor circuit 15 generates the multifunction control signal 22 based on the received sensor signals. In the exemplary embodiment, the control signal 22 is hard wire input to the spray monitor circuit 18 (such as an iTrax™ system, for example). Alternatively, the control signal 22 may be sent to any other control circuit or function that shuts down the spray machine when one or more of the monitored conditions is at fault, and/or issues a warning signal as described above. In the embodiments herein, the spray monitor circuit 18 includes power relay contacts (FIG. 9) that open and shut off the associated spray machine S if the control signal 22 is a false (indicating a fault condition exists). Alternatively, spray machine shutdown may be effected by a different control circuit or a different technique. Still further, spray machine power contacts may also be provided with the monitor circuit 15 itself.

Figure 1A:
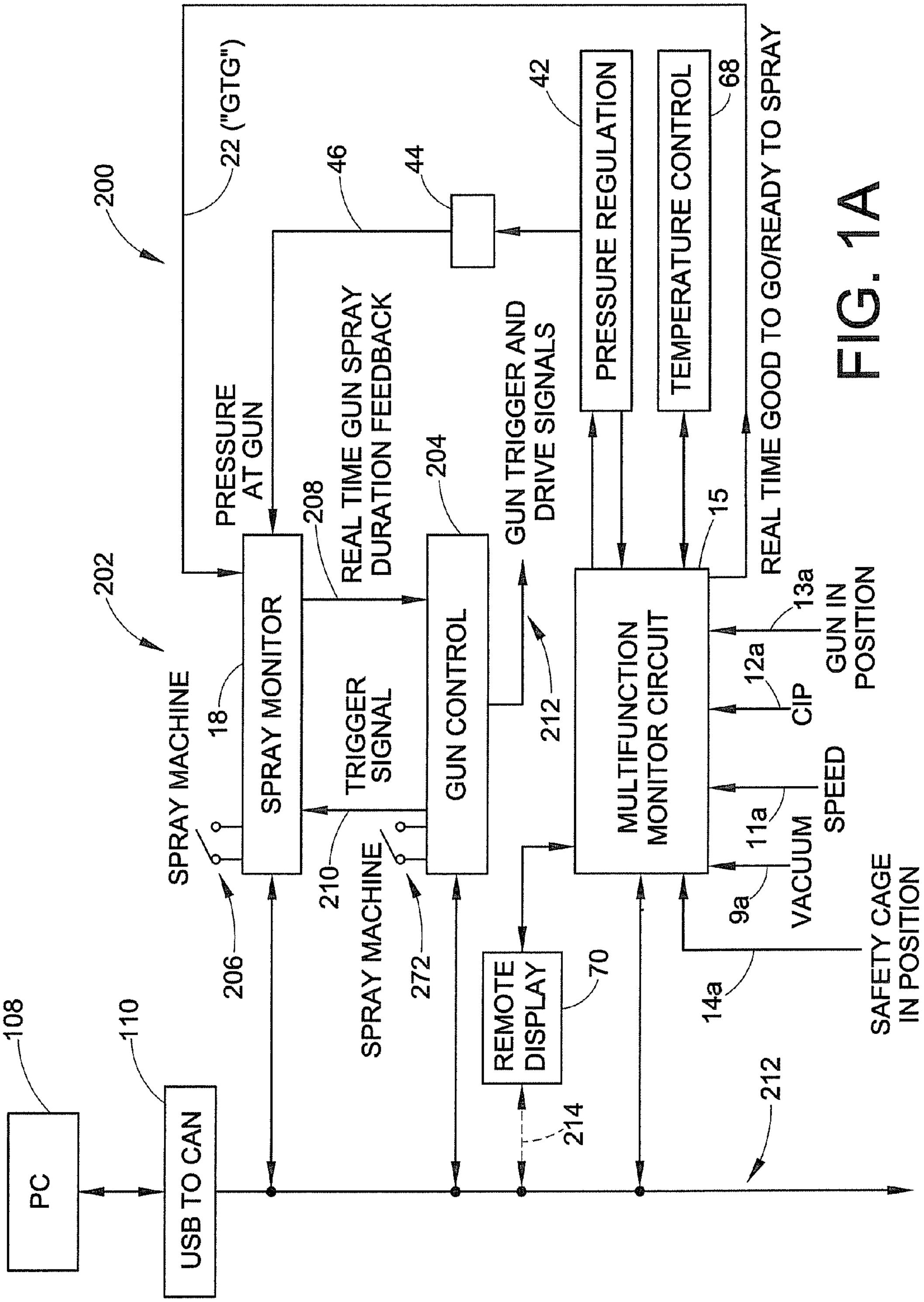
FIG. 1A is a functional block diagram of an exemplary embodiment of a control system for can coating, including optional control and monitoring modules.

With reference to FIG. 1A, we show a system level functional block diagram of a spray machine monitor and control system embodiment 200 such as may be used, for example, with the spray machine S of FIGS. 1 and 2. FIG. 1A is illustrated for a single spray machine, it being understood that additional monitor control systems may be added to the network bus as required for a complete spray line or multiple spray lines.

The basic system of FIG. 1A may be an original build, or may be a modified system based on a previously installed or available system such as an iTrax™ system.

Figure 8:
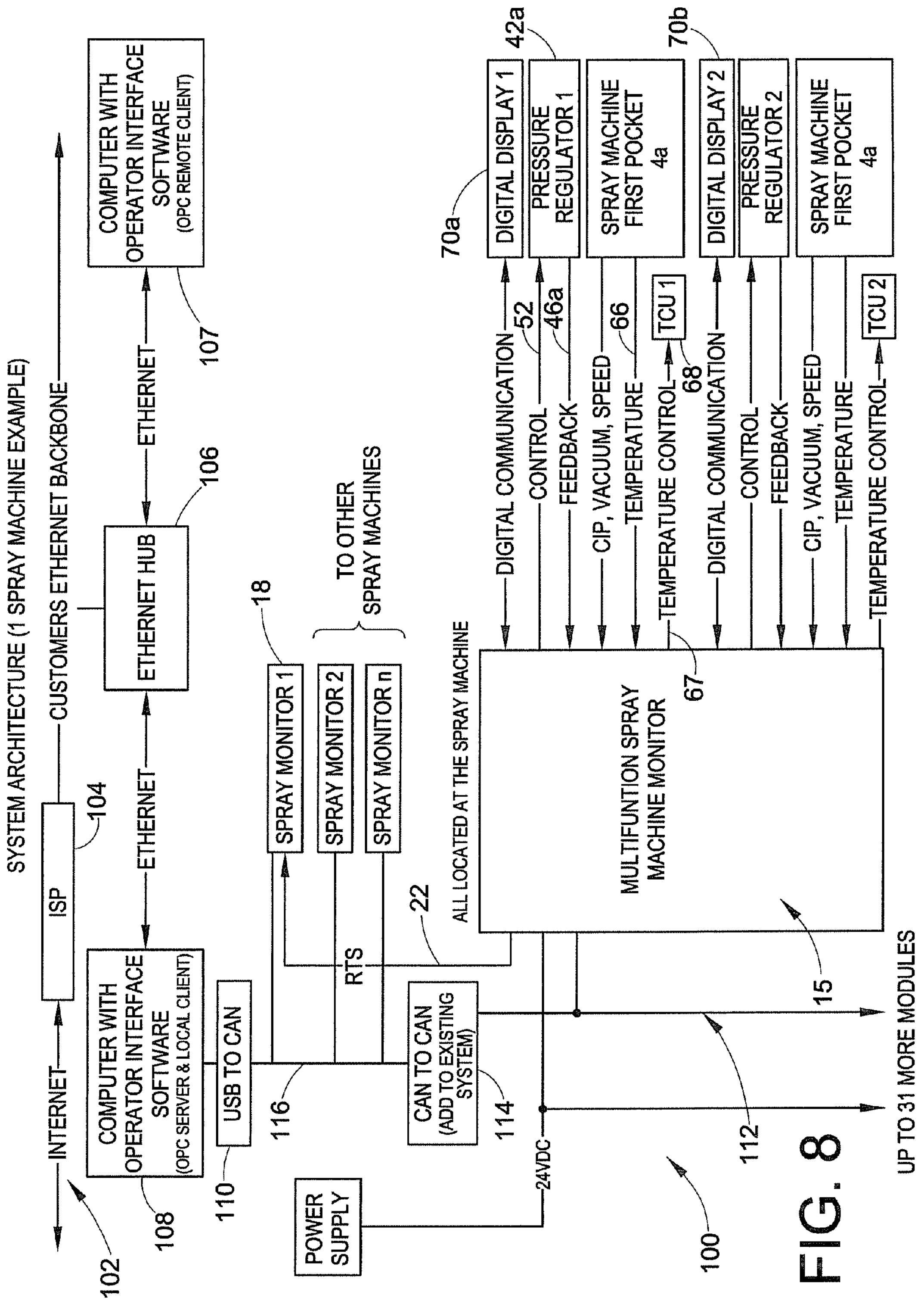
FIG. 8 is a functional block diagram of a system architecture for a coating system such as in FIG. 1.

In FIG. 1A, and also see FIG. 8, a computer or controller 108 may be provided as an operator interface, such as a personal computer for example. The computer 108 stores or may be used to input one or more recipes that an operator may select based on the type of coating material to be applied and the type of work piece W. A recipe may be used on a single spray machine, multiple spray machines, a single spray line, multiple spray lines and so on. A typical recipe may include a variety of parameters such as, for example, coating material base and fire pressures, gun trigger timing, flow rates, temperature, rotation speed and so on. The PC 108 communicates with the control system 200 over a suitable network, such as a CAN network 112. A suitable USB to CAN converter 110 may be used as needed. Recipes may also be created or modified via one or more of the modules 202, such as, for example, the spray monitor circuit module 18.

Also communicating with the network 112 are one or more modules 202. Each module 202 may receive all or a portion of a particular recipe that will be executed by the associated spray machine. In the FIG. 1A embodiment, each spray machine has an associated spray monitor circuit module 18, gun control circuit module 204 V and a multifunction spray machine monitor module 15. For spray machines having two spray guns or spray stations, additional gun control circuit modules 204 may be added to the network 112. Alternatively, a single gun module may contain circuitry for multiple spray guns in the spray machine.

It is important to recognize that FIG. 1A, as well as the other system block diagrams herein, are exemplary and intended to show functional relationships. The drawings do not necessarily imply or require a specific physical embodiment of the various circuits. For example, the block diagrams herein are based on a configuration that may be used to modify or add functionality to an existing system such as an iTrax™ system. But such need not be the case, and the physical embodiment of, for example, FIG. 1A may be realized with an original build. Thus, various functions may be carried out by different modules, either those shown or others, or a module type system would not be required in all cases, but for example, a single circuit system could be connected to the network. An advantage of a modular system is that it allows a designer to choose what functionality is to be included in a particular system, and also allows for ease of expansion to a larger system.

Recipes or portions thereof may be downloaded or transferred from the PC 108 to each module 202 as need be. In the example of a system enhancement, the PC 108, converter 110, CAN network 112 and one or more spray monitors 18 may be part of a pre-installed iTrax™ system. Alternatively, these portions may be provided as part of a new installation.

The spray monitor circuit 18 may include spray machine power control relay contacts 206 that open when the spray monitor circuits 18 determines that the spray machine should be shut down. For example, the spray monitor circuit 18 receives the control signal 22 (GTG or RTS) from the multifunction spray machine monitor circuit 15. If the control signal 22 indicates the spray machine is not ready, the spray monitor circuit 18 may hold the contacts 206 open until the fault conditions are fixed. Operator overrides may also be provided if so required. The spray monitor circuit 18 also receives a pressure signal 46 from a pressure regulation and controller circuit 42 (FIGS. 4 and 5) that relates to base and/or fire pressure of the coating material at the spray gun. The spray monitor circuit 18 may interrupt the spray machine via the contacts 206 if an out of range pressure condition is detected. The spray monitor circuit 18 may also use the pressure signal 46 to provide a real time gun spray duration feedback signal 208 to the gun control circuit 204 as will be more fully described below to determine true spray duration in real time. The spray monitor may also receive a gun trigger signal 210 from the gun control circuit 204 so that an operator can visually note if the spray gun is firing correctly, and compare that to the actual spray duration time. The gun trigger signal 210 in one embodiment is a digital signal that reflects the on and off times that the gun control circuit 204 commands the gun to operate for a given coating operation. In other words, it may be a digitized version of the actual drive signal sent to the spray gun 4 by the gun control circuit 204 for a coating operation. Thus, the real time spray duration feedback signal 208 is the actual spray duration produced by the gun during a coating operation in response to the gun trigger signal 210. The subsequent gun trigger signal 210 (for the next coating operation) corresponds to the actual drive signal for the next coating operation and reflects compensation based on the real time spray duration feedback. The spray monitor may also monitor flow parameters based on the received pressure signals.

The gun control circuit module 204 may be used to generate appropriate gun drive signals 212 as well as to adjust the trigger and drive signals to achieve the commanded spray duration based on the real time feedback signal 208. The gun control circuit may also be used to operate a clean spray gun operation.

In addition to the control signal 22, the multifunction spray machine monitor circuit module 15 may be used to carry out pressure regulation and temperature control as will be described below.

Still another module 202 may be a remote display 70 (FIG. 7) as will be further described below. The remote display 70 for example may be used to display the same data that is placed on the bus 112, but at a location proximate the spray machine. In the exemplary embodiment, the remote display 70 communicates via the multifunction spray monitor 15, but alternatively may communicate through different modules or directly to the bus 112 as represented by phantom line 214 in FIG. 1A.

The computer 108 may also be used for data logging information placed on the bus 112 by any of the modules 202. As done, for example, with the iTrax™ system, the computer 108 may also be used for module configuration and system calibration processes as required.

In order to achieve good can coating, it is also necessary that the coating material be properly supplied or delivered to the spray gun 4. Two of the primary factors in the nature of the coating material for good coating operations are the pressure and temperature of the coating material. We have found that good coating consistency and repeatability are achieved by monitoring and regulating pressure of the coating material proximate the spray gun, with optionally also including control of the temperature of the material. The local pressure control is realized by monitoring the pressure of the coating material in or proximate the spray gun, rather than at a more distant location in the fluid circuit. The exemplary embodiment of the monitor circuit 15 in relative close proximity to the spray machine is useful for also implementing a locally controlled pressure and temperature profile of the coating material, although the pressure and optional temperature monitoring and regulation may alternatively be performed by a separate or different control system.

Figure 4:
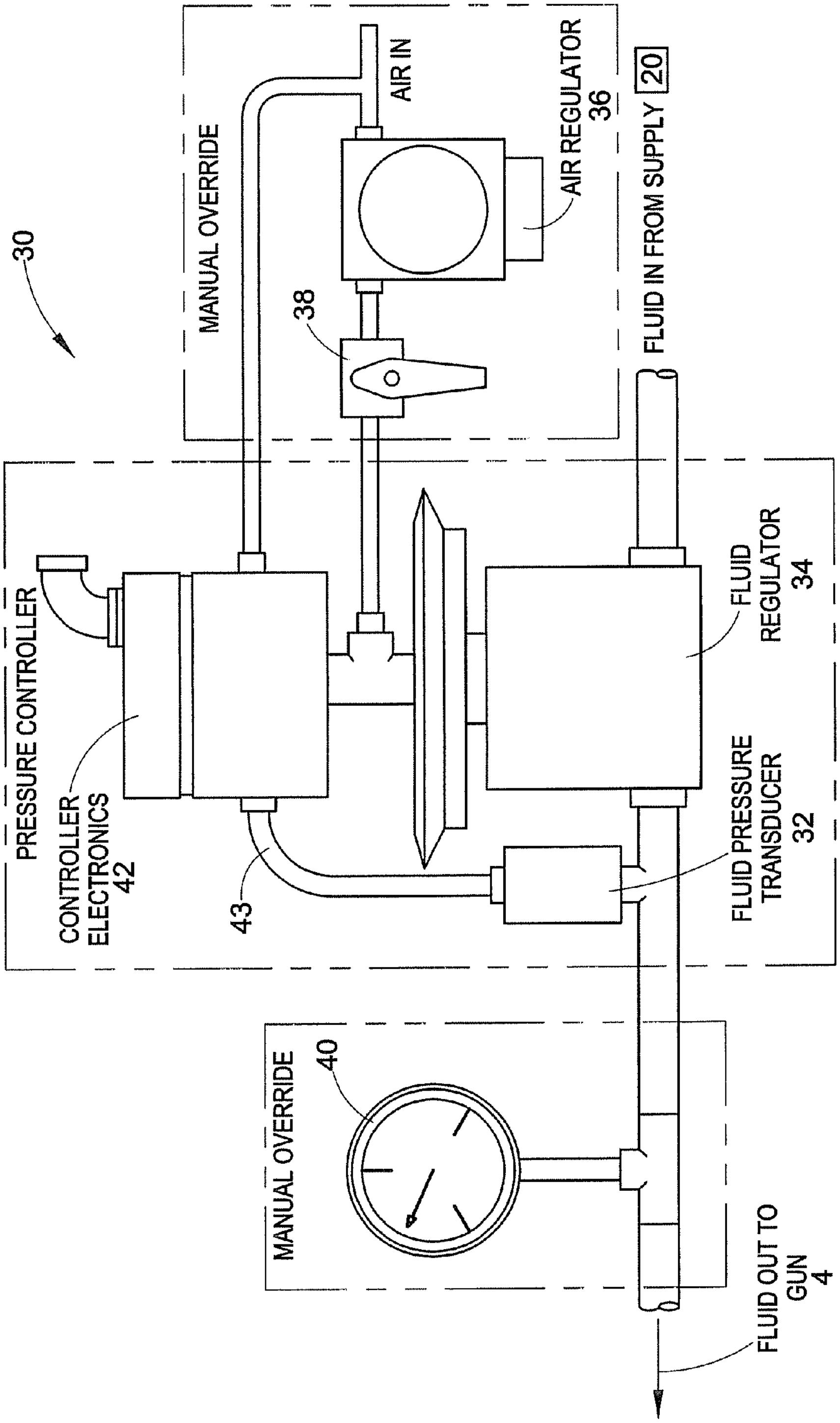
FIG. 4 is simplified fluid schematic of an exemplary pressure regulation system.

FIG. 4 shows an exemplary embodiment of a fluid circuit 30 that includes a fluid pressure transducer 32 at the output of a fluid regulator 34 to monitor the pressure of the coating material being supplied to the spray gun 4. A separate fluid circuit 30 may be used for each spray gun in a system or two or more guns may share a common fluid circuit as needed. The fluid circuit 30 may also include an air regulator 36 for the fluid regulator 34, as well as a bypass valve 38 for manual override of the air regulator 36. A pressure gauge 40 may be provided for visual verification of the pressure of the material supplied to the spray gun 4 when in a manual override mode of operation. A pressure control circuit 42 may be provided that allows for local regulation and control of the fluid pressure delivered to the spray gun 4, based on a commanded base pressure 45, such as for example received from the spray monitor circuit 18. By base pressure is meant the steady state pressure of the material supplied to the gun, and the fire pressure is the fluid pressure when the gun is actually outputting material through a nozzle or other output orifice. The spray monitor circuit 18 may receive the target (i.e., commanded) base pressure as part of a recipe download. As will be described below, the spray monitor 15 may also adjust the base pressure setting in relation to a wrap count. The pressure control circuit 42 locally controls the fluid pressure supplied to the gun 4 by adjusting the air pressure delivered to the fluid regulator 34 based on the sensed fluid pressure (in the form of signal 43) from the first pressure transducer 32. The manual override is provided, for example, in case the control circuit 42 should fail. The operator can use the bypass valve 38 to manually adjust the output pressure as read from the manual gauge 40.

Figure 5:
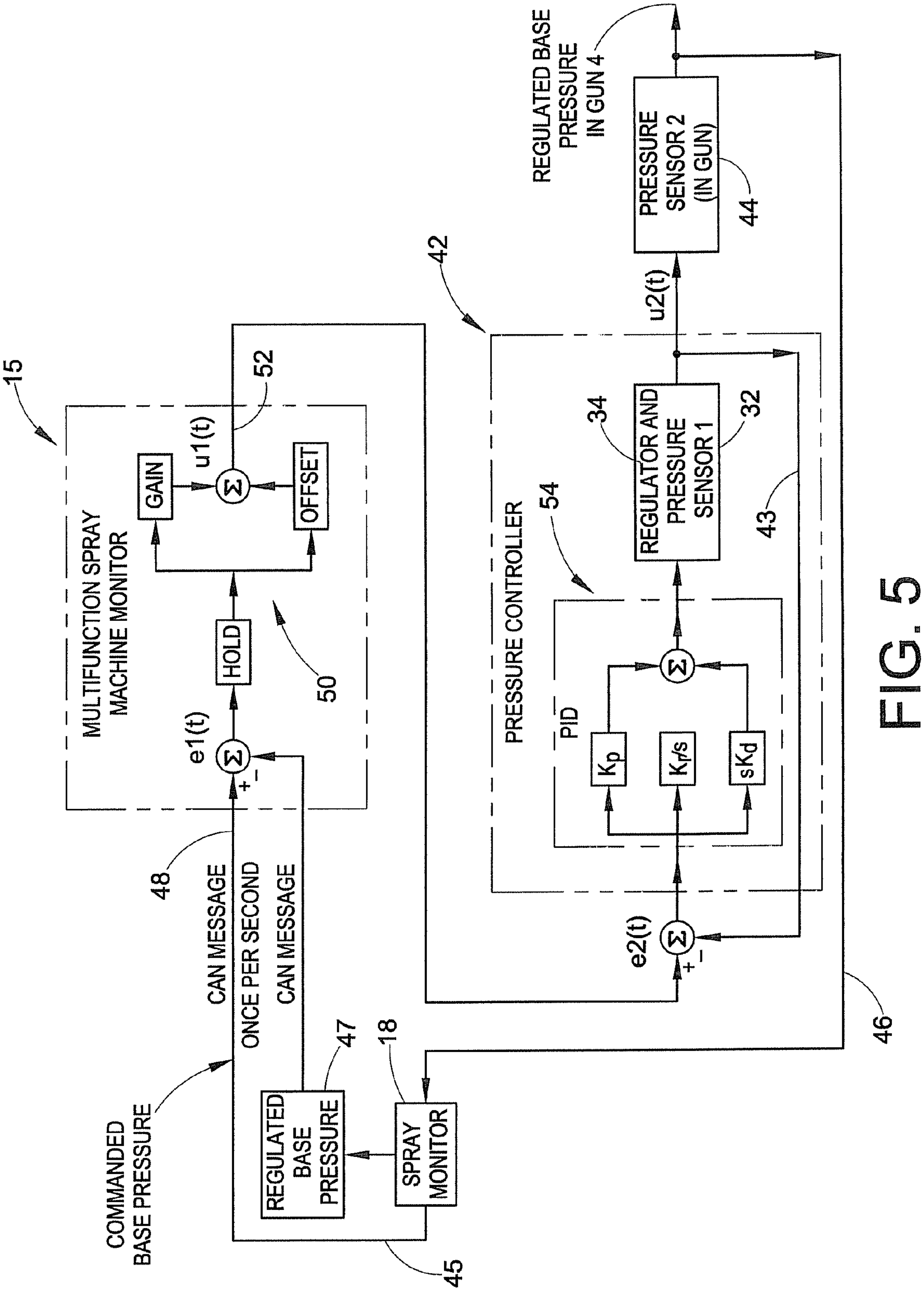
FIG. 5 is an functional block diagram of an exemplary control circuit for the pressure regulation system of FIG. 4.

The control schematic of FIG. 5 shows the incorporation of the hardware of FIG. 4 in a closed control loop for controlling the pressure of the coating material supplied to the spray gun 4. In FIG. 5, the fluid pressure transducer 32 of FIG. 4 is referred to as pressure sensor 1. Pressure sensor 2 of FIG. 5 is a second fluid pressure sensor 44 inside the gun 4 or at close proximity to the spray gun 4. By close proximity or proximate is simply meant that the gun pressure sensor 44 is located in the fluid circuit sufficiently close to the gun so that its reading is substantially the same as the fluid pressure inside the gun. The second pressure sensor 44 and sensor head mounting is shown in U.S. Pat. No. 5,999,106 that is hereby incorporated by reference in its entirety.

The output signal 46 from pressure sensor 2 (actual gun pressure) may be input to the spray monitor circuit 18 and used to determine the regulated base and/or fire pressure signal 47. The spray monitor circuit 18 outputs the sensed pressure value 47 and also a commanded pressure value 48 to the multifunction spray machine monitor circuit 15. In the exemplary embodiment, this communication is performed over a network such as, for example, the CAN network 112 or other suitable network or communication system. The monitor circuit 15 receives the commanded pressure value and sensed pressure value and through a conventional sample, gain and offset circuit 50 (or other suitable error detection algorithm and circuit) determines an error value or regulation signal 52 when the measured pressure in the spray gun differs from the commanded pressure. This regulation signal 52 is input to the pressure control circuit 42 where it is combined with the first pressure sensor output signal 43 so as to adjust the regulator 34 output pressure to the gun until the pressure in the gun (as sensed by the second transducer 44) is the same as the commanded pressure. In the exemplary embodiment of FIG. 5, a conventional PID control loop 54 may be used, but alternatively other closed loop control functions may be used. In this way, the fluid pressure at the gun is accurately and locally set and maintained in a closed loop fashion.

While the local pressure regulation provides for more accurate and responsive pressure regulation in the spray gun, the exemplary embodiment also allows other optional advantages to be realized. By using the spray monitor circuit 18 to issue the commanded pressure as part of a supervisory control loop, internal security functions within the overall control system (such as an ITrax system for example) better ensures that only authorized pressure changes are made. The system however may be provided with an electronic override knob adjustment when necessary since the spray monitor circuit 18 will typically include a visual display for the operator. Communication between the local pressure regulation function 42 and the spray monitor circuit 18 and the PC 108 over a network (116 in FIG. 8) or through other data links also facilitates data display and logging of the actual pressure in the spray gun 4.

Figure 5A:
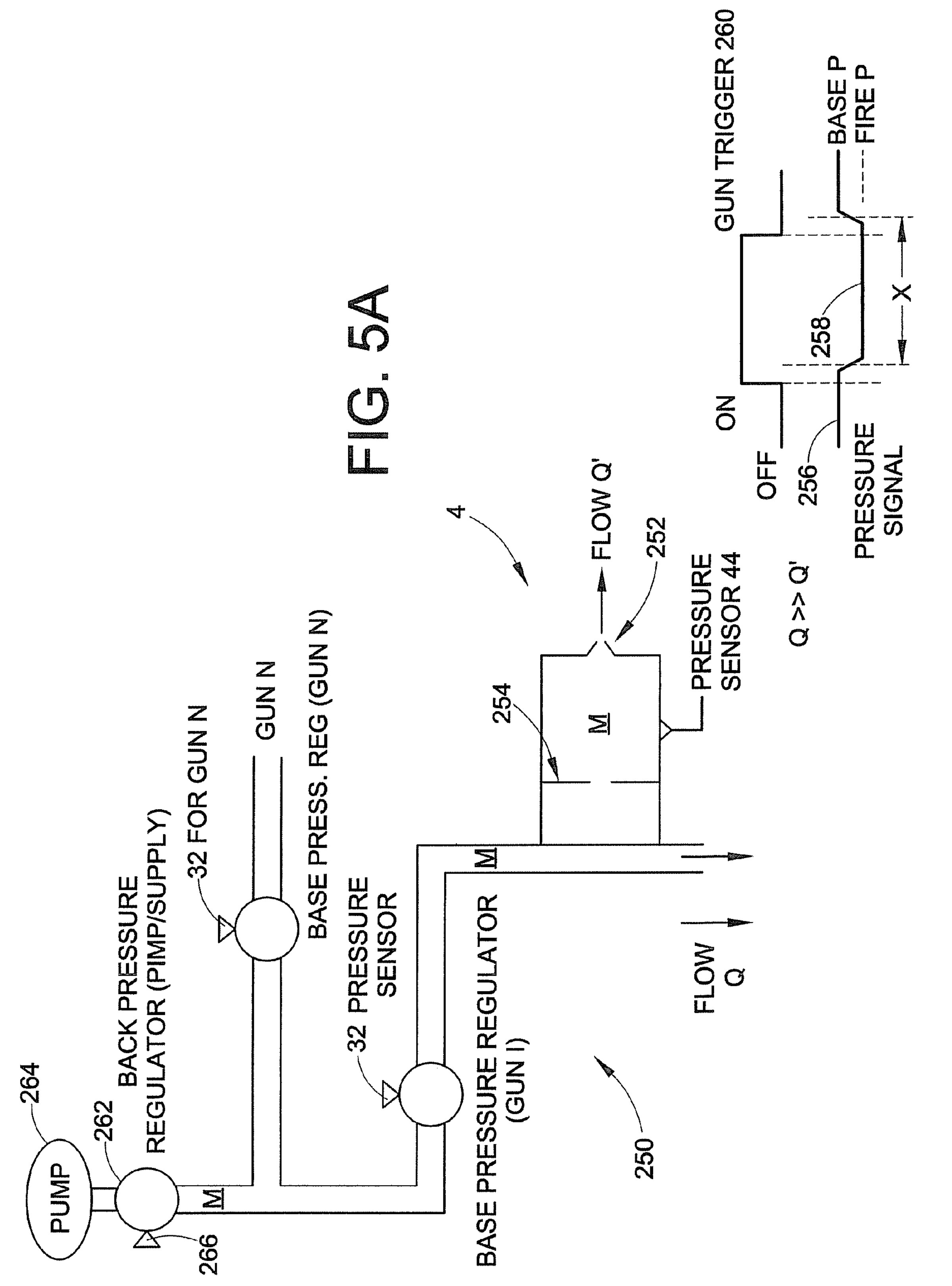
FIG. 5A is a simplified fluid circuit schematic for a spray gun and supply of coating material.

With reference to FIG. 5A, the pressure regulation concepts of the present disclosure are illustrated with reference to a fluid circuit 250 for supplying fluid to a spray gun 4. The spray gun 4 typically includes a nozzle 252 through which coating material M is discharged at a typical flow rate Q. The spray gun communicates with a main flow Q through a controlled orifice plate 254. The second or gun pressure sensor 44 detects fluid pressure between the controlled orifice plate and the nozzle. When the gun is off, the sensor 44 measures the base pressure 256, and after the gun turns on this pressure drops to a fire pressure 258. There are inherent turn on and turn off delays between the trigger or drive signal 260 and the actual spray duration represented by time X. In addition to or as an alternative to regulating the pressure at or proximate the spray gun, pressure regulation may be implemented at the back pressure regulator 262 associated with a pump 264 for supplying coating material to the spray guns, using a third pressure sensor 266.

The ability to command and locally regulate the coating material pressure in the spray gun, also permits a supervisory range control function or process to be executed for improving wrap coating quality. An exemplary process includes the spray monitor circuit 18 determining a wrap number that is based on the rotation speed of the workpiece and the actual spray time duration X. The faster the speed, the higher the number of wraps for a given spray duration (spray duration being indicated by the known actual gun on and off times). The slower the rotation speed the lower the number of wraps for a given spray time duration. Typically, the spray monitor 18 will have a range for an acceptable wrap number for the various recipes. If the system determines that the wrap number is low, the system may command an increase in the base pressure at the gun (locally regulated as described herein above with respect to FIGS. 4 and 5), and if the system determines that the wrap number is high, it can command a lower base pressure at the gun. In this manner the spray monitor 18 or other control circuit can actively control the spray weight of the coating material as the rotation speed varies (or for example as temperature varies when active temperature control is not used.) The pressure changes for wrap number may be automatically implemented or the system could send a message or request for the operator to decide whether to approve the pressure change.

Figure 6:
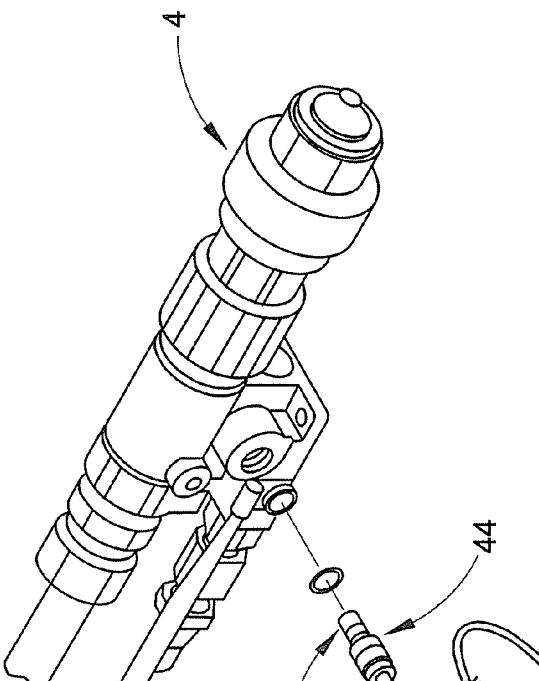
FIG. 6 illustrates a spray gun with a sensor head having a pressure sensor and temperature sensor therewith.
Figure 6:
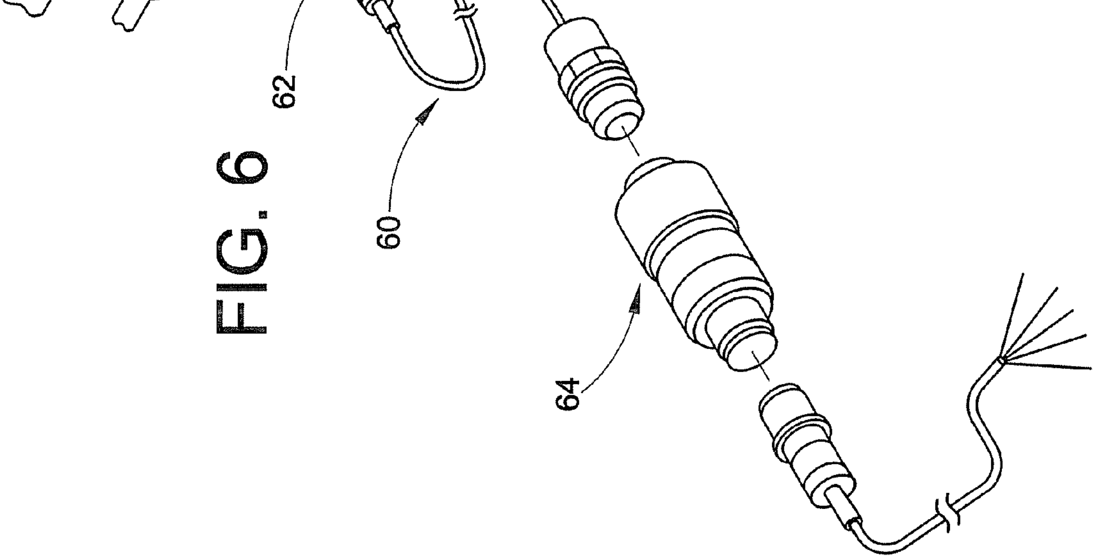

FIG. 6 illustrates the gun fluid pressure sensor 44 connected by an armored cable 60 to a spray gun 4 that may be used with the present inventions. The spray gun 4 is preferably but not necessarily an electrically operated spray gun such as a MEG gun available from Nordson Corporation and shown in U.S. Pat. No. 5,791,531 which is incorporated herein by reference in its entirety. According to another inventive aspect of the present disclosure, a temperature sensor 62 may be disposed adjacent or near to the pressure sensor 44 to sense the temperature of the coating material in the gun 4. The temperature sensor 62 may be, for example, a conventional RTD type sensor although other temperature sensors may be used as required. The wires associated with the temperature sensor 62 may be routed through the armored cable 60 with the wires for the pressure sensor 44. Signal conditioning circuitry for the temperature sensor output signal may conveniently be provided in the amplifier section 64. The coating temperature value 66 (FIG. 8) provided by this sensor 62 may be used to control a conventional heater\chiller 68 (FIG. 8) in the fluid circuit, or other temperature adjusting system, to raise or lower the temperature of the coating material as necessary. A closed loop control function such as a PID control loop may also be used for the closed loop temperature control. By closed loop controlling the temperature of the coating material at the spray gun, the viscosity of the coating material is maintained within the desired range to help to ensure that the spray pattern produced by the spray gun is satisfactory for coating the can. Monitoring and controlling the temperature in the spray gun or proximate to the gun enhances the local pressure regulation as well since pressure will vary with temperature of the coating material, and the spray monitor circuit 18 may adjust the recipes based on the detected temperatures. By monitoring and controlling the pressure and temperature of the coating material at the gun, the spray monitor circuit 18 can verify that the material delivery system is properly operating for a coating operation.

While the pressure regulation function is preferably done locally so as to provide faster real time closed loop control of the material pressure at the spray gun 4, temperature of the coating material typically changes at a slower rate than pressure. Therefore, the closed loop temperature control function may if desired be executed in the spray monitor circuit 18 rather than having a local control loop in the spray machine monitor control circuit 15, although the latter may be done as an alternative. For existing systems this allows the temperature control loop function to remain in place, but adding in the feature of monitoring the actual coating material pressure at the gun. In such an embodiment, the command and control signals for controlling the heater/chiller unit 68 may communicate over the network since closed loop response time is slow compared to local pressure regulation.

Figure 7:
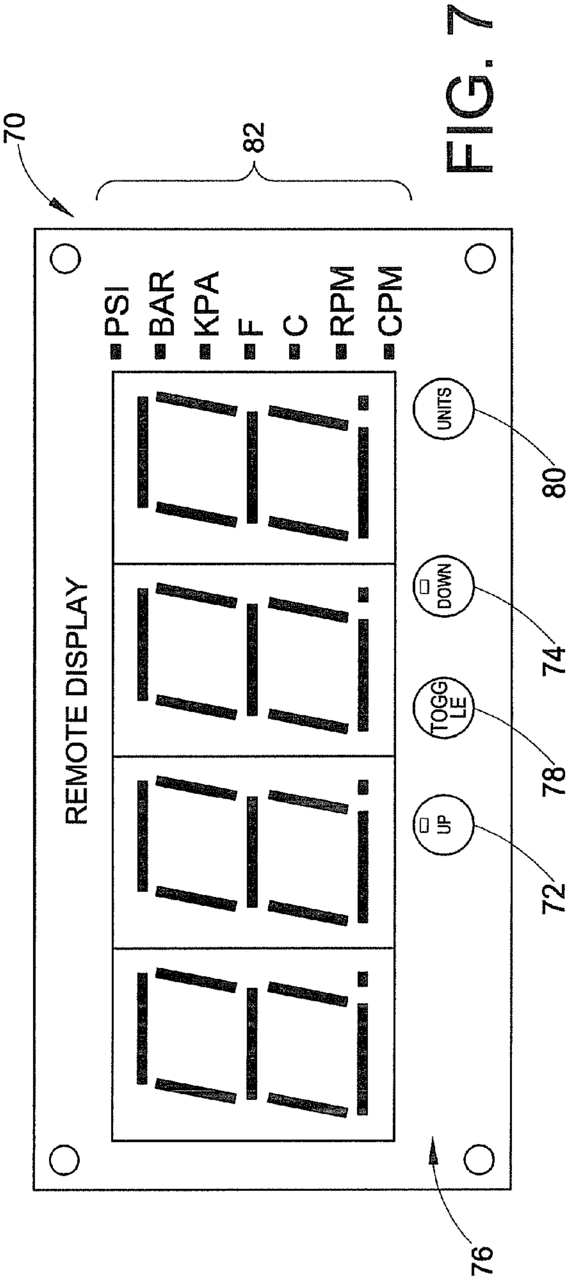
FIG. 7 is an exemplary remote display.

FIG. 7 shows a remote display 70 inventive feature of the present disclosure. To understand the benefits of this feature it is necessary to understand that there may be a multifunction spray machine monitor circuit 15 for each spray machine S and there may be several multifunction spray machine monitor circuits 15 communicating with a single primary control circuit computer that is monitoring the operation of several spray machines in a can manufacturing facility. It may be useful in some applications to have information concerning the operation of the spray machine right at the spray machine for the operator to observe. However, it is cumbersome to attempt to put the primary computer at the spray machine and of course a single computer cannot be located at several spray machines. Therefore, the display shown in FIG. 7 is connected to the multifunction spray machine monitor circuit 15 to display some of the values detected by the monitor circuit or to display operational information accessible to the monitor circuit 15, and the remote display 70 may be positioned at or proximate to the spray machine so that the operator can monitor parameters and operation of individual spray stations. Up and down switches 72, 74 of the remote display may be provided to scroll through menus presented on the screen 76, such as for example, coating material fluid pressure in psi, bar or kpa (kilopascals) at the spray gun 4, coating material temperature at the spray gun 4 in F.° (Fahrenheit) or C.° (centigrade), speed of the rotating can in rpm (e.g. chuck speed) or production rate of the spray machine in cpm (cans coated per minute).

A toggle switch 78 may be provided, for example, to switch between spray machines. For example, in the exemplary embodiment, two spray stations (e.g. two star wheels and two spray guns) may be monitored using a common monitor circuit 15 (see FIG. 8). A units button 80 may be used to allow the operator to select the units 82 listed on the side of the display. Providing the ability to display this information at each spray machine through a remote display such as the one shown in FIG. 7 is highly advantageous to the customer. Because the machine monitor circuit 15 communicates over the network bus to the primary control circuit 18, the information and data displayed on the remote display 70 advantageously is the same data that is being sent to and logged by the primary control circuit 18.

As an alternative embodiment, the remote monitor 70 need not be a dedicated monitor hardwired into the local electronics of the monitor control circuit 15. For example, the remote monitor may be part of a laptop computer or other portable device that has a monitor and that has a wireless connection to the monitor circuit 15, such as, for example, a WiFi or Bluetooth™ connection.

FIG. 8 illustrates an exemplary architecture for an overall system 100 such as may be used with the various inventions herein especially but not necessarily in cooperation with a pre-existing system such as an iTrax™ system. Internet or other network or communication access may be provided by any suitable system 102 such as an ISP connection 104 to a customer or user Ethernet hub 106. A remote client computer 107 may be provided for additional user interface locations, but such remote clients are to be distinguished from the remote display 70 that preferably is located at or proximate a spray machine. A suitable computer 108 (for example, the computer in FIG. 1A) may be used with a conventional USB to CAN network interface 110 to allow a user to communicate with one or more spray monitor circuits 18 (three such circuits are represented in FIG. 8). Although a CAN network is shown in the exemplary embodiments, any suitable communication system may be used for a particular system. Since there may be typically two spray gun stations for each spray machine, sensor inputs and other control and monitoring functions associated with two spray guns 4*a* and 4*b* are shown connected to a single multifunction spray machine monitor 15 (note in FIG. 8 the details for only one of the spray monitor circuits 18 interfacing to a machine monitor circuit 15 is shown). Digital Display 1 may be a first remote display 70*a* like the example in FIG. 7 provided with respect to one gun of the spray machine at any convenient location close to the spray machine. Pressure Regulator 1 (42*a*) represents the pressure control loop 42 that produces a feedback signal 46*a* similar to the feedback signal 46 provided by the closed loop control system 42 of FIG. 5. This feedback signal 46 may be input to the spray monitor 18 over the network. Spray Machine First Pocket 4*a* represents the sensor inputs from a spray machine, when used, from the vacuum sensor, rotational speed sensor and can-in-pocket sensor for one gun of the spray machine. Although not shown, the sensor readings for the gun-in-position sensor and safety guard sensor may also be provided when used. The temperature sensor value 66 from the spray gun (as explained with respect to FIG. 6 herein) may be provided and a control signal would be provided that is sent over the CAN network 112 via the multifunction spray machine monitor 15. The temperature control command 67 to the TCU 1 (temperature control unit 1) to control the temperature of the coating material may be received from the spray monitor circuit 18, also over the CAN network 112. Similar connections and interfaces are provided for the second spray gun that is monitored by the monitor circuit 15. The spray monitor 15 may be used to shut down the spray machine if pressure and/or temperature of the material are unacceptable or out of range.

As also illustrated in FIG. 8, and especially but not exclusively in the case of a retrofit scenario, a CAN to CAN buffer 114 may be used to interface the machine spray monitor circuit 15 to the CAN bus 116 that communicates with the spray monitor circuits 18 and the PC 108. The buffer 114 functions as a repeater or buffer to create an isolated network, so that if a fault occurs in one or more of the monitor circuits 15 or other modules, the spray monitor circuits 18 will be isolated and still able to control and monitor operation of the spray machines.

In the exemplary case of FIG. 8, the coating operation control signal 22 (e.g. a ready-to-spray RTS or Good-to-Go GTG signal) is sent from the multifunction spray machine monitor circuit 15 directly to the spray monitor circuit 18, such as for example through a direct (i.e. non-network) hardwired or wireless or other suitable connection. There may be a separate control signal 22 for each spray gun, although alternatively a single control signal 22 could be based on all of the sensor inputs from both spray stations. A direct connection may be preferred in some cases where the reliability of the signal is not to be dependent on the network functionality or speed. In some alternative embodiments, however, the control signal 22 may be transmitted across the network. In addition, the spray monitor circuit 18 receives or generates a trigger signal T (FIG. 2) to trigger the spray gun. If both the trigger signal and coating operation control signal 22 are present, the can in position is sprayed. There are at least two other possible scenarios in the exemplary embodiment:

1. "You were asked to spray but not ready." Under this scenario the trigger signal is present but there is no control signal 22. At the user's option, production can be stopped and a spray machine alarm fault message can be generated to indicate a problem with the spray machine can feed (for example, no can-in-pocket signal), vacuum or rotational speed, or that the gun is not in position or safety cage is not closed.
2. "You were ready to spray but not told to spray." Under this scenario, a control signal 22 is present, but there is no trigger signal. The system can stop production and generate a spray machine timer alarm fault message.

The monitor circuit 15 thus provides monitoring of selectable conditions to generate a coating operation control signal. The proximate location of the monitor circuit 15 to the machine stations also facilitates local pressure and temperature control and regulation of the coating material for the spray guns.

Figure 9:
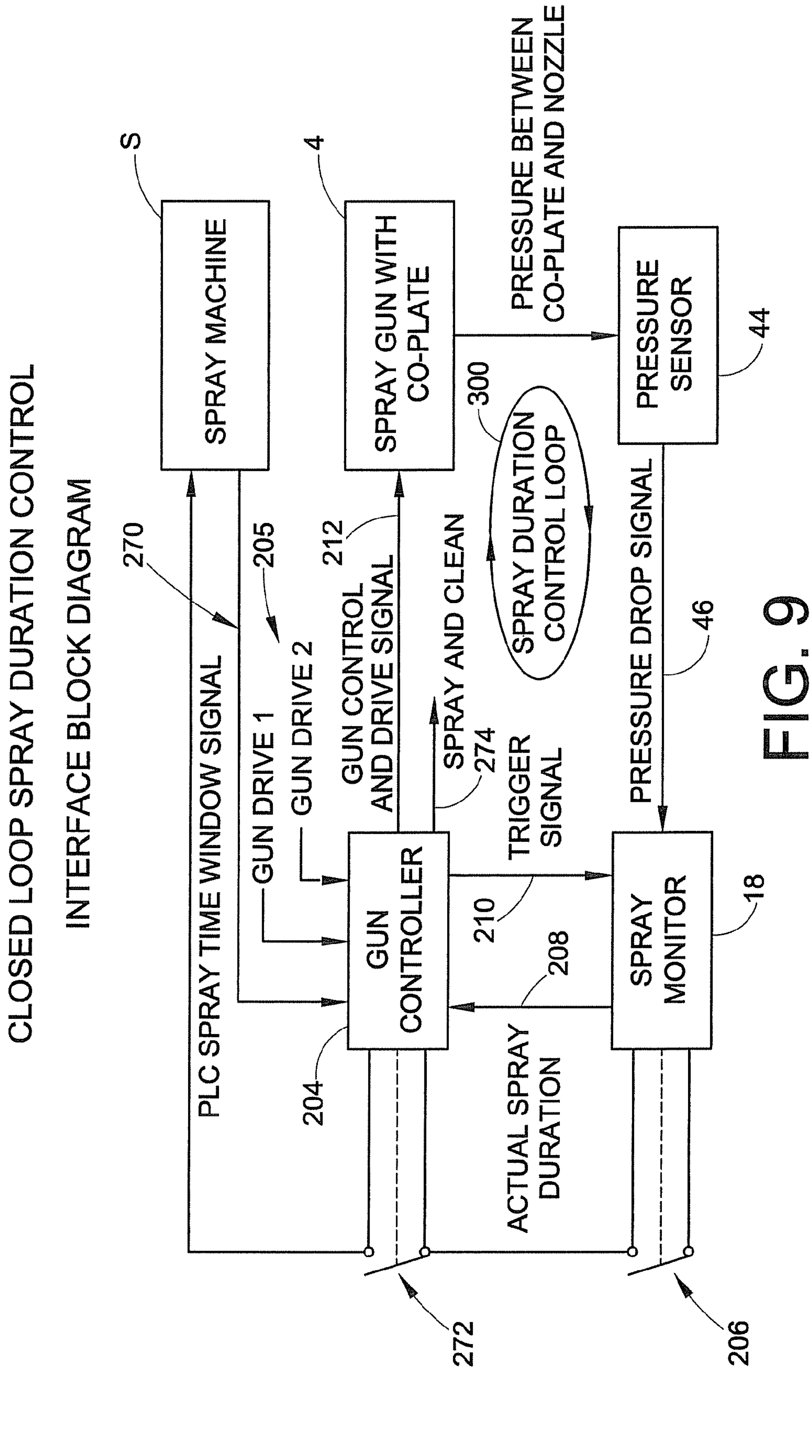
FIG. 9 is a functional block diagram of a gun control circuit.
Figure 10:
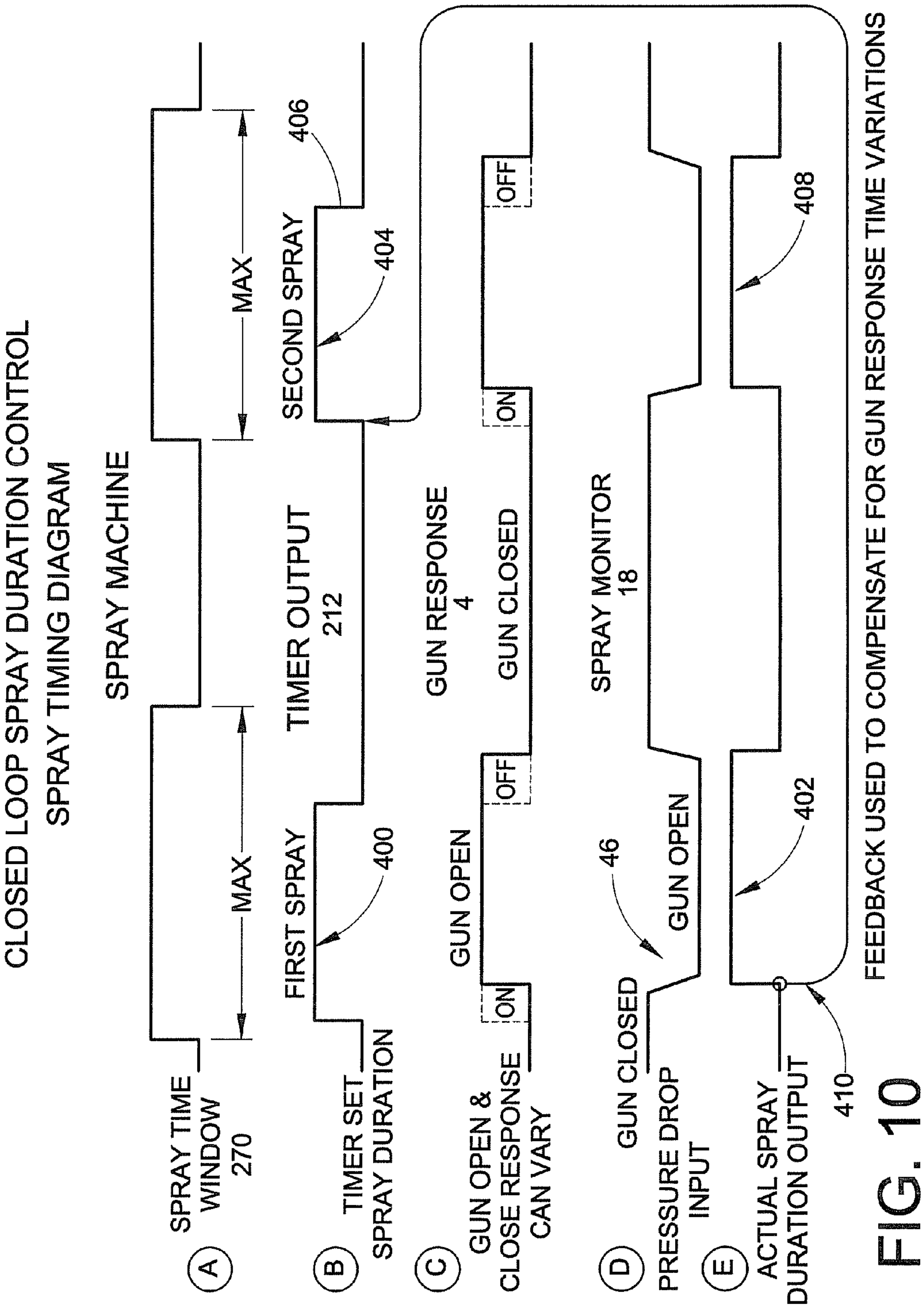
FIG. 10 is an exemplary timing diagram for the circuit of FIG. 9.

With reference to FIGS. 9 and 10, in accordance with another inventive aspect of the disclosure, the gun control circuit or module 204 operates to adjust the gun on/off times and also may optionally selectively generate drive signal voltage and current wave forms in relation to the type of spray gun being used. The timing parameters preferably are based on the real-time fluid pressure feedback signal 46 from the spray gun pressure sensor 44.

The feedback signal 46 is ideally represented in FIG. 5A and the actual spray duration time X can easily be determined from this signal in real time. For example, a simple threshold detector circuit may be used to detect the transition events between the base and fire pressure levels. Other techniques may be used to derive the spray duration time from the real time pressure signal 46. In the exemplary embodiment, the signal 46 is input to the spray monitor circuit 18, which may include the spray machine shutdown contacts 206 that open if the pressure signal 46 indicates the material pressure is out of acceptable range.

The spray monitor circuit 18 generates a real time gun trigger signal 210 that corresponds to the actual spray duration of the spray gun for the last completed firing. The spray monitor circuit 18 may also receive a trigger monitor signal 208 from the gun control circuit 204. This trigger monitor signal 208 corresponds to the trigger or drive signal that the gun control circuit 204 uses to actually drive the spray gun on and off. Thus, the spray monitor 18 may compare or analyze the commanded trigger times with the measured actual spray duration time to verify the gun drive circuit and spray gun are operating properly.

The gun control circuit 204 receives the real time spray duration feedback signal 210 and can adjust the gun drive signal 212 timing as appropriate for the next gun spray cycle so as to produce the desired actual spray duration. This closed loop control 308 based on real time spray duration feedback improves accuracy of the wrap number count and accuracy of the coating weight, particularly in combination with the optional expert system pressure adjustment described hereinabove.

The gun control circuit 204 may receive different gun drive signal profiles 205, such as for example during recipe download and configuration from the operator interface computer 108 over the network 112. The gun control circuit 204 can thus pattern the gun drive signal 212 for the specific type or model spray gun it is controlling.

Note in FIG. 9 that also shown or represented is the spray machine S, having associated with it a PLC or other controller that controls an overall spray time window 270. This window 270 may be realized, for example, by a combination of various timing requirements, such as, for example, the CIP signal and the star wheel index so that a spray window only opens when a can is in position, indexed and rotating for a coating operation. Thus, the trace 270 is not necessarily an actual signal but generically represents the spray time window as controlled in part by the spray machine work piece controlling functions. The gun control circuit 204 may also be provided with shutdown contacts 272 that shut off the spray machine if the spray duration time is out of range. Alternatively, warning signals may be generated or used in combination. In one embodiment as in FIG. 9, the gun control circuit contacts 272 may be in series with the spray monitor circuit contacts 206.

Figure 12:
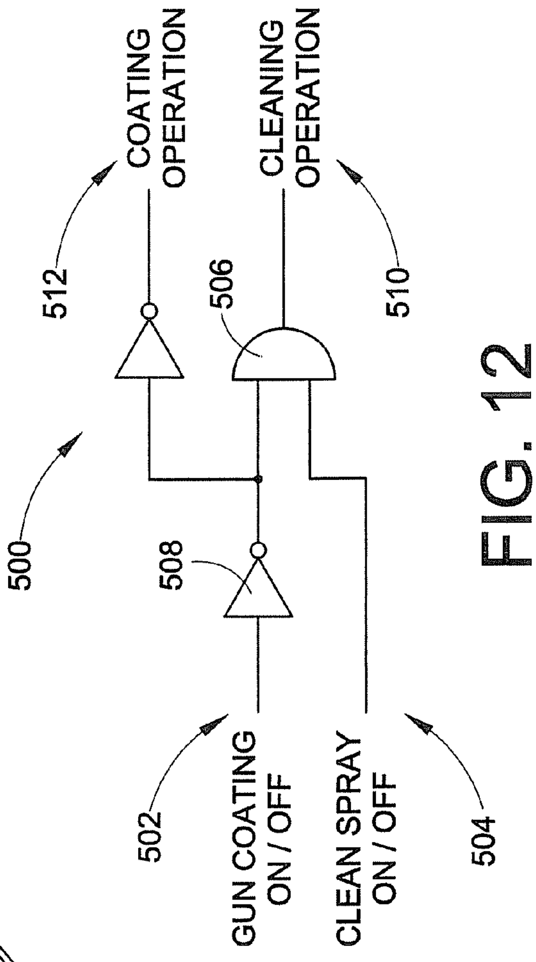
FIG. 12 is a logic diagram for a circuit to control coating and clean spray operations.

Some spray guns 4 include cleaning mechanisms 300 (FIG. 2) for the spray nozzles to keep the nozzles free from buildup of the coating material. The gun control circuit 204 may further be configured to control the cleaning mechanism 300 as appropriate with a clean spray control signal 274. FIG. 12 illustrates a control circuit 500 that may be used in systems that incorporate clean spray technology. The spray gun 4 responds to a first control signal 502 for a coating operation, and a second control signal 504 for a clean spray operation during which the nozzle may be clean of contamination and residue. A logic AND gate 506 along with a first logic inverter 508 produces an first output 510 that can only the clean spray signal 504 is true and the coating control signal 502 is false. Any other condition of the signals produces a low output 510 so that a cleaning operation is prevented or locked out if there is also a coating control signal 502 present. Similarly, when the coating control signal 502 is true, an output 512 is produced to permit a coating operation by the spray gun, and a cleaning operation is inhibited because the first output 510 is false. Thus, the control circuit 500 assures that the spray gun may be operated in a cleaning mode or coating mode but cannot be accidentally operating in both modes at the same time, thus in effect providing a lockout function of the cleaning mode when a coating mode control signal is received.

The gun control circuit may also be configured to prevent an operator from attempting to program spray gun operation that is outside the capabilities of the gun. For example, if an operator tries to fire a gun more quickly than it can function and still apply a good coating, the gun control circuit may interrupt the spray machine or lock out the requested change.

All of the control functions, monitoring functions and operation of the various modules described herein may be realized using well known hardware and software design criteria, or others later developed.

FIG. 10 illustrates an exemplary control scheme for closed loop control of the actual spray duration time. In this example, the first spray cycle 400 produces an actual spray duration 402. This actual spray duration time 402 may then be used to adjust the next cycle spray duration times output 404—for example shortening or lengthening the gun turn off edge 406 as appropriate—to achieve the desired spray duration 408 on the next cycle. In FIG. 10, trace A represents a typical maximum spray time window cycle for a spray machine. Trace B represents a typical gun trigger or drive signal that turns the spray gun on and off within the allotted window of trace A. Trace C in a simplified manner illustrates how the actual spray duration (actual time period that coating material is applied to a work piece) can vary from the control signal of trace B based on gun on and off delays, for example. Trace D illustrates in an idealized manner a typical pressure signal 46 from the spray gun pressure sensor 44, and trace E represents a timing signal that may be derived from the pressure signal 46 and used to adjust the drive signal 212 on the subsequent cycle (represented by the feedback line 410 in FIG. 10).

Figure 11:
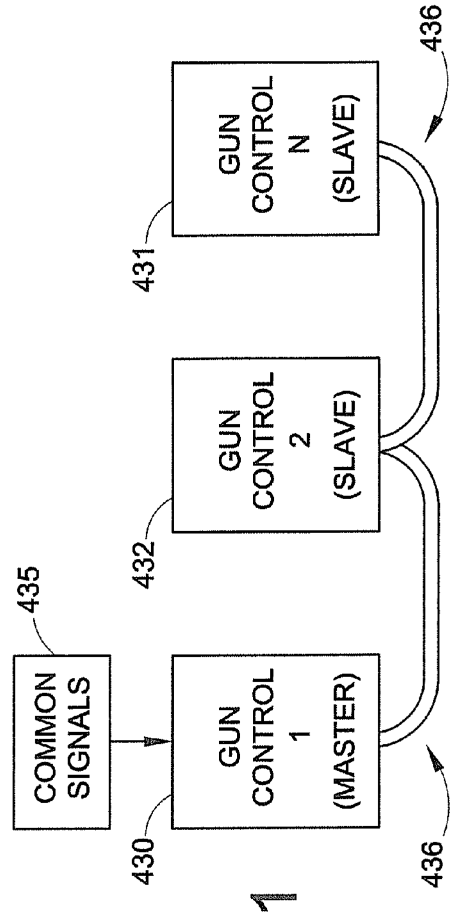
FIG. 11 is a simplified wiring diagram for a plurality of gun control modules.

With reference to FIG. 11, another advantage that may optionally be derived from the modular concept, is a daisy chain wiring concept that may significantly reduce time, labor and complexity of wiring a system in the field. In FIG. 11, three gun control modules 430, 432 and 434 are shown. In other embodiments, two gun control circuits were discussed since the exemplary spray machine only used two spray guns. But other spray machines may use more than two spray guns. In a modular design that uses multiple gun control modules to drive the spray guns, various signals 435 used by the gun control modules may be common. For example, the gun control modules will all use the CIP signal, an index signal (which indicates the star wheel position, spray duration times, power, ground and so on. Since the gun control circuits 430, 432 and 434 all respond to or interface with the same spray monitor circuit 18, there is an opportunity to simplify wiring by providing a daisy chain between the gun control modules such as for example with a ribbon cable 436. The modules may be arranged in a master/slave configuration (for example, in FIG. 11 the gun control 1 may be the master and the others the slaves) so that a shift register or similar timing scheme such as executed in software may be used to control when data on the ribbon cable is valid for which module in the chain. A time multiplexing scheme may alternatively be used. This daisy chain approach reduces wiring to each individual module. It may also be implemented with other modules used in the overall system.

The inventions have been described with reference to the exemplary embodiments. Modifications and alterations will occur to others upon a reading and understanding of this specification. It is intended to include all such modifications and alterations insofar as they come within the scope of the appended claims or the equivalents thereof.

Having thus described the invention, we claim:

1. A method for controlling an actual spray duration time of a coating gun that sprays coating material onto a surface of a container during a coating operation, comprising the steps of:

detecting rotational speed of the container to determine the number of revolutions of the a can during a time period, generating a trigger signal to the coating gun during the coating operation based on said detected rotational speed, said trigger signal having a trigger signal duration to turn the coating gun on to spray coating material from the coating gun onto the surface of a container and to turn the gun off to terminate the spraying of coating material from the coating gun;

detecting changes in the pressure of the coating material supplied to the coating gun during the coating operation;

generating a pressure signal that is a function of said detected pressure changes detected during the coating operation;

determining an actual spray duration based on said detected pressure changes during the coating operation;

comparing said actual spray duration with said trigger signal duration and if said actual spray duration is longer than said trigger signal duration then decreasing said trigger signal duration of a subsequent coating operation, and if said actual spray duration is shorter than said trigger signal duration then increasing said trigger signal duration of a subsequent coating operation.

2. The method of claim 1 wherein said actual spray duration is displayed.

3. The method of claim 1 wherein said pressure signal has a first state that corresponds to a base pressure of the coating material supplied to the coating gun before the coating gun is turned on, and a second state that corresponds to a fire pressure of the coating material supplied to the coating gun after the coating gun is turned on, wherein the step of determining said actual spray duration is made as a function of transitions between said first and second states.

4. The method of claim 1 wherein a drive signal is used to turn the coating gun on to spray coating material from the coating gun and to turn the coating gun off to terminate the spraying of coating material from the coating gun, and wherein a first drive signal is used to turn the coating gun on and off to coat a first container during a first coating operation, and a first actual spray duration is determined for said first coating operation based on said detected pressure changes, and wherein said first actual spray duration time is used to produce a second drive signal to turn the coating gun on and off to coat a subsequent container during a subsequent coating operation, said second drive signal being different from said first drive signal.

5. The method of claim 1 wherein there is a separate coating operation for each container and comprising the step of adjusting at least one of a coating gun turn on and a coating gun turn off time for a subsequent coating operation as a function of said actual spray duration of a preceding coating operation.

6. The method of claim 1 comprising the step of controlling spray weight of coating material onto a surface of a container by determining a wrap number that is based on said detected rotational speed of the container and said actual spray duration.

* * * * *